United States Patent
Shams et al.

(10) Patent No.: US 11,887,501 B1
(45) Date of Patent: Jan. 30, 2024

(54) PORTABLE AND INTERCONNECTABLE TRAINERS

(71) Applicants: Parviz Shams, Laguna Beach, CA (US); Arian Shams, Laguna Beach, CA (US)

(72) Inventors: Parviz Shams, Laguna Beach, CA (US); Arian Shams, Laguna Beach, CA (US)

( * ) Notice: Subject to any disclaimer, the term of this patent is extended or adjusted under 35 U.S.C. 154(b) by 0 days.

(21) Appl. No.: 18/096,203

(22) Filed: Jan. 12, 2023

Related U.S. Application Data

(63) Continuation of application No. 17/588,894, filed on Jan. 31, 2022, now Pat. No. 11,557,225.

(60) Provisional application No. 63/144,434, filed on Feb. 1, 2021.

(51) Int. Cl.
  *H02J 3/32* (2006.01)
  *H02J 7/02* (2016.01)
  *H02J 3/00* (2006.01)
  *G09B 23/18* (2006.01)

(52) U.S. Cl.
  CPC ......... *G09B 23/186* (2013.01); *G09B 23/187* (2013.01); *G09B 23/188* (2013.01); *H02J 3/007* (2020.01); *H02J 3/32* (2013.01); *H02J 7/02* (2013.01)

(58) Field of Classification Search
  CPC .. G09B 23/186; G09B 23/187; G09B 23/188; H02J 3/007; H02J 3/32; H02J 7/02
  USPC ........................................................ 434/380
  See application file for complete search history.

(56) References Cited

U.S. PATENT DOCUMENTS

| | | | |
|---|---|---|---|
| 5,562,454 A | 10/1996 | Kanzaki et al. | |
| 11,363,713 B1* | 6/2022 | Haim | G06F 30/34 |
| 11,557,225 B1 | 1/2023 | Shams et al. | |
| 2002/0124120 A1* | 9/2002 | Dixon | G01R 31/318342 710/1 |
| 2012/0082972 A1* | 4/2012 | Theriault | G09B 23/00 434/276 |

OTHER PUBLICATIONS

Portions of prosecution history of U.S. Appl. No. 17/588,894, filed Dec. 28, 2022, Shams, Parviz, et al.

* cited by examiner

*Primary Examiner* — Michael R. Fin
(74) *Attorney, Agent, or Firm* — Makoui Law, PC; Ali Makoui

(57) ABSTRACT

A system of interconnecting trainers is provided. The trainers may share power and/or exchange control signals, resulting in reduction in weight/size and increase in portability. Some of the trainers may include a rechargeable battery to allow the trainers to operate without being connected to an AC outlet. A power source selector switch may select an external AC power source or the internal battery to be used by the trainer. Some of the trainers may include one or more DC and/or AC signal distribution relays that may receive control signals from student designed circuits or controllers and may provide DC and/or AC signals to other trainers. Some of the trainers may include built-in devices such as oscilloscopes, signal generators with displays, multimeters, and pneumatic devices.

20 Claims, 28 Drawing Sheets

US 11,887,501 B1

PORTABLE AND INTERCONNECTABLE TRAINERS

CLAIM OF BENEFIT TO PRIOR APPLICATIONS

This application is a continuation application of U.S. patent application Ser. No. 17/588,894, filed Jan. 31, 2022. U.S. patent application Ser. No. 17/588,894 claims the benefit of U.S. Provisional Patent Application Ser. No. 63/144,434, filed on Feb. 1, 2021. The contents of U.S. patent application Ser. No. 17/588,894 and U.S. Provisional Patent Application 63/144,434 are hereby incorporated by reference.

BACKGROUND

Instructional trainers are systems that are used to teach students the design and analysis concepts of building circuits, using programmable logic controllers (PLCs), controlling pieces of industrial equipment such as motors or pneumatics devices, etc. The instructional trainers may include electrical devices, mechanical devices, electro-mechanical devices, optical devices, pneumatic devices, etc. The instructional trainers may be used as a part of a training course and are typically set up in a lab with access to electrical outlets and bench space.

BRIEF DESCRIPTION OF THE DRAWINGS

The various embodiments of the present portable and interconnectable trainers now will be discussed in detail with an emphasis on highlighting the advantageous features. These embodiments depict the novel and non-obvious portable and interconnectable trainers shown in the accompanying drawings, which are for illustrative purposes only. These drawings include the following figures, in which like numerals indicate like parts.

DETAILED DESCRIPTION

Figure 1A:
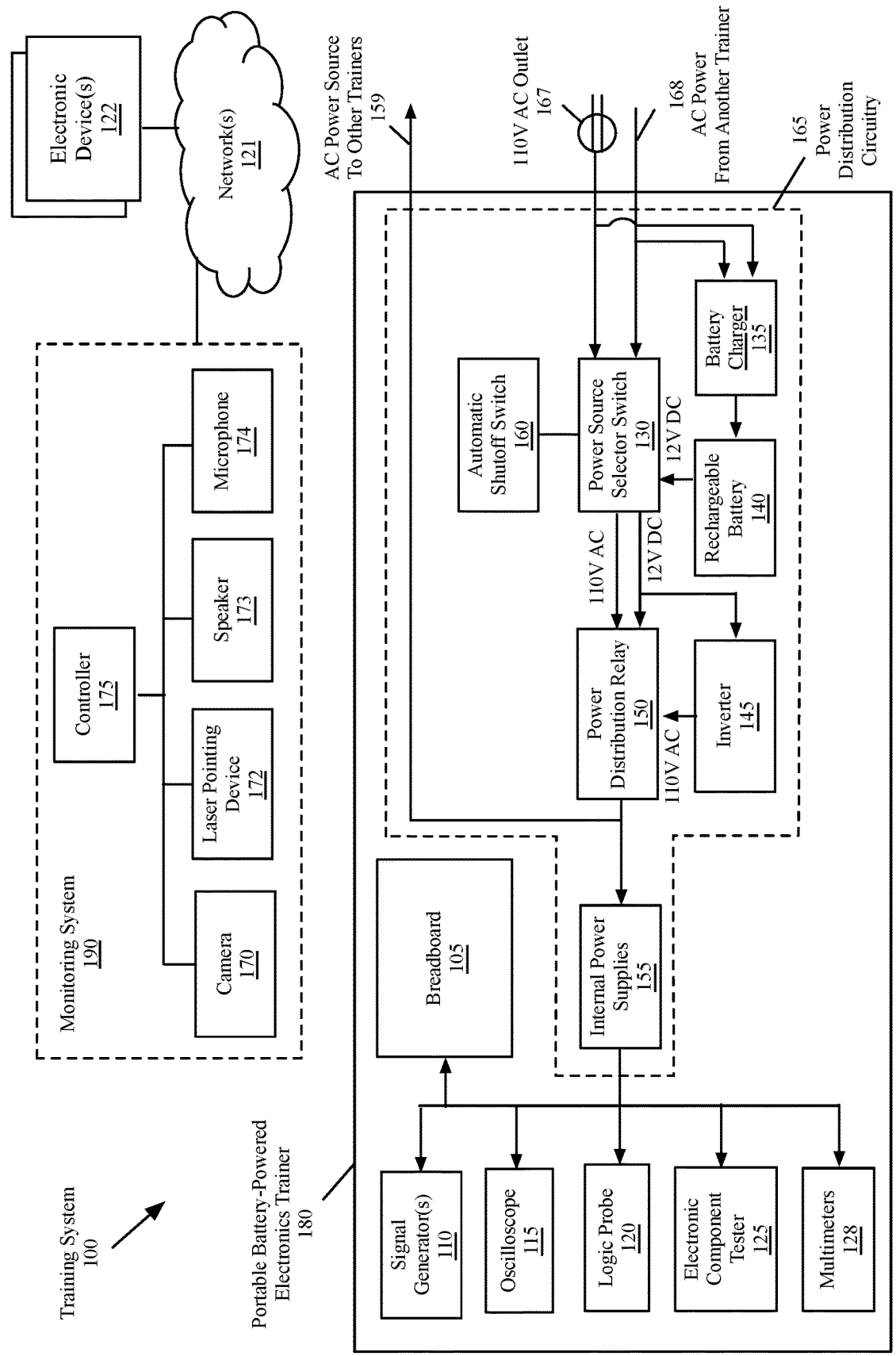
FIG. 1A is a functional block diagram illustrating a training system that includes an electronics trainer that may operate on battery power, may receive power from other trainers, may provide power to other trainers, and/or may provide control signals to other trainers, according to various aspects of the present disclosure.

One aspect of the present embodiments includes the realization that the existing instructional trainers work on AC power and require lab setup to provide AC outlets and bench space. The students may have to work in the lab area, which limits the number of students that may have access the trainers to the available lab space. Another shortcoming of the prior art trainers is the packing of all equipment required to teach students the operation of a particular device in one trainer, which results in making the trainers bulky, heavy, and difficult to move around. For example, in order to train the students the operation of a motor, the prior art trainers may have to also include a PLC or other types of control circuit in the trainer to control the motor. Another shortcoming of the prior art trainers is that the heavy weight and the large size of these trainers make them unpractical for shipping to students at home who study online.

The present embodiments, as described in detail below, solve the above-mentioned problems by providing the capability of connecting multiple instructional trainers together to share power and/or to exchange control signals, resulting in reduction in weight and increase in portability. As an example, a motor trainer or a pneumatics trainer may not include a PLC or other control circuitry to control the motor or the pneumatic devices. Instead the control signals may be received from an interconnected trainer that includes a student designed circuit or a PLC trainer. As a result, the weight and the size of the motors or pneumatics trainers may be reduced by not including the controller devices and circuitry in these trainers. The weight and the size of the electronics trainers or the PLC trainers may also be reduced by including some of the devices that the students may want to control by these trainers in other trainers. The modular trainers of the present embodiments with reduced weight and size may be easily shipped to the students at home as a part of a distance education program.

The instructional trainers of some embodiments may include direct current (DC) signal distribution relays, alternative current (AC) signal distribution relays, DC input terminals, and/or AC input terminals, where each trainer may provide control signals to other trainers and/or may receive some or all of the needed control signals from one or more other trainers. The AC or DC signal distribution relays may be activated based on a circuit that the students design, which may be on the same trainer or on another interconnected trainer.

Some of the instructional trainers of the present embodiments may include a rechargeable battery. These trainers may either operate from an extremal AC power source or from the internal battery. The battery-operated trainers may be set to battery mode, unplugged from the AC outlet, and may be taken by the students to any place, without the need for accessing an AC outlet.

The instructional trainers of the present embodiments may be connected to other trainers to provide power to and/or to receive power from the other trainers. For example, one trainer may provide power to one or more other trainers, or a first trainer may provide power to a second trainer, which in turn may provide power to a third trainer, etc. A trainer that provides power to other trainers may itself operate on battery, resulting on the interconnected trainers operating without any access to an AC outlet.

The remaining detailed description describes the present embodiments with reference to the drawings. In the drawings, reference numbers label elements of the present embodiments. These reference numbers are reproduced below in connection with the discussion of the corresponding drawing features.

I. Electronics Trainers

Figure 1B:
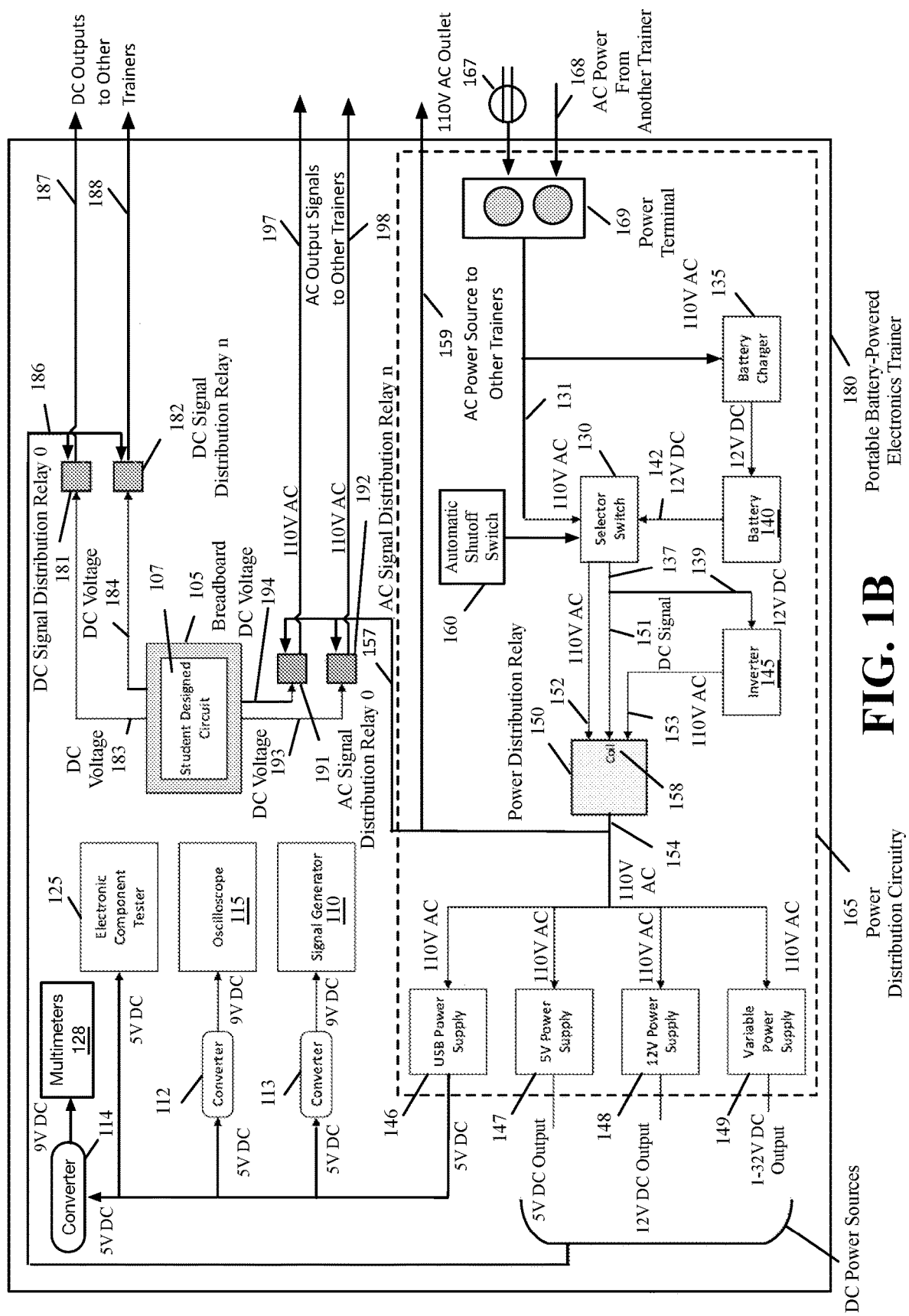
FIG. 1B is a functional diagram illustrating the interconnections of the electronics trainer of FIG. 1A, according to various aspects of the present disclosure.

The instructional trainers of the present embodiments include electronics trainers. Some of the present embodiments provide a training system that includes a portable battery-powered instructional electronics trainer and an instructor's monitoring system. FIG. 1A is a functional block diagram illustrating a training system that includes an electronics trainer that may operate on battery power, may receive power from other trainers, may provide power to other trainers, and/or may provide control signals to other trainers, according to various aspects of the present disclosure. FIG. 1B is a functional diagram illustrating the interconnections of the electronics trainer of FIG. 1A, according to various aspects of the present disclosure.

With reference to FIGS. 1A and 1B, the training system 100 may include a portable battery-powered electronics trainer 180 and a monitoring system 190. The portable electronics trainer 180 may be in a briefcase-like box (the portable box/portable case) that may be shockproof, waterproof, and air sealed. The portable box may include a handle for picking up and carrying the trainer.

The electronics trainer 180 may be used to teach students circuit design and analysis concepts by building circuits on a breadboard that may be supplied with AC and/or DC voltage sources. The electronics trainer 180 may include, inside the portable box, a breadboard 105 and one or more of the followings: a signal generator 110, an oscilloscope 115, a logic probe 120, an electronic component tester 125, a plurality of multimeters 128, and a power distribution circuitry 165. The power distribution circuitry 165 may include a power source selector switch 130, a battery charger 135, a rechargeable battery 140, an inverter 145, a power distribution relay 150, an automatic shutoff switch 160, and/or one or more internal power supplies 155 (e.g., the internal power supplies 146-149 of FIG. 1B).

The breadboard 105 may be used as a construction base for prototyping of electronics and experimenting with circuit design. The breadboard 105, in some embodiments, may be a solderless breadboard that may include many contact points. The contact points may include holes (e.g., with spring clips) to receive electronic components' pins and/or connection wires (e.g., jump wires). Some of the contact points (e.g., the contact points that are located on the sides of the breadboard) may be used as terminals to send and receive control signals, to receive power to the components on the breadboards, to provide power to other devices on the trainer, etc. The electronics trainer 180 may also include a set of terminals near the breadboard to connect the inputs or the outputs of other components of the electronics trainer 180 to the breadboard, to supply AC or DC power, and/or to measure variables on the circuit built on the breadboard 105.

The signal generator 110 may receive a DC power and may output one or more user selectable waveforms. The signal generator 110 may include a display (e.g., and without limitations, a liquid crystal display (LCD) display) to show the waveform that is being outputted. The output of the signal generator 110, in some embodiments, may be provided to a set of terminals near the breadboard to allow the output to be connected by wires to the components on the breadboard.

The oscilloscope 115 may operate on a DC power. The inputs of the oscilloscope 115 may be connected to a set of terminals near the breadboard to allow electrical signals from different components on the breadboard to be connected to the oscilloscope's inputs and waveforms corresponding to received electrical signals be displayed on the display of the oscilloscope. The oscilloscope 115, which is integrated in the portable case of the electronics trainer 180 and operates on an internally generated DC power, provides the technical advantage over the prior art electronics trainers that have to be connected to external oscilloscopes. An external oscilloscope requires lab setup such as additional bench space and an AC outlet, and may not be practical to be carried around with a portable trainer. In addition, it may be unpractical or expensive to ship an individual external oscilloscope to each individual student who participate in distance education programs.

The logic probe 120 may operate on a DC power and may be used as a logical True or False tester. The logic probe 120 may be wired to a set of terminals near the breadboard to allow connecting wires to the terminals and measuring whether the voltage at the inspection point of the logical probe is high or low to determine the logical True or False state of the inspection point. The electronic component tester 125 may operate on a DC voltage and may include a socket for inserting IC chips to determine whether the chips are functional and to provide the details about the chips.

Each multimeter 128 may be configured to measure one or more parameters such as, electrical voltage, electrical current, resistance, capacitance, conductance, sound levels (e.g., in decibels), duty cycle, frequency, inductance, and/or temperature. The multimeters 128 may be configured to measure AC and/or DC currents and voltages. The multimeters 128 may operate on a DC power. Each multimeters 128 may include a small display (e.g., and without limitations, a light emitting diode (LED) display) to display the measure parameters. The inputs of the multimeters 128 may be connected to a set of terminals near the breadboard to allow the outputs from different components on the breadboard to be connected to the multimeters inputs to measure different parameters. In addition to, or in lieu of the multimeters, some embodiments may include one or more voltage measuring devices (e.g., voltmeters) that may only measure AC and/or DC electric voltages.

The multimeters 128, which are integrated in the portable case of the electronics trainer 180 and operate on an internally generated DC power, provide the technical advantage over the prior art electronics trainers that have to be connected to external multimeters. To measure electrical parameters of a circuit in the prior art trainers, multiple external multimeters have to be provided as separate items to the students. These external multimeters may be lost or misplaced when needed. In addition, the external multimeters have also to be carried as separate items when a portable trainer is moved around.

Different trainers of the present embodiments may have different power supply mechanisms. The trainers, in some embodiments, such as the electronics trainer of FIGS. 1A-1B, the PLC trainer of FIGS. 3A-3B, the motors trainer of FIGS. 5A-5B, and pneumatic trainer of FIGS. 8A-8B may operate either on external AC power or on an internal battery. The external AC power, in some of these embodiments, may be received from another trainer and/or from an AC outlet. These trainers may be removed from the AC power source and may continue to operate as long as their battery has charge and/or as long as they receive power from another trainer. The battery may be a rechargeable battery, such as, for example, and without limitations, an acid battery, a lithium-ion (Li-ion) battery, a lithium-ion polymer (Li-ion polymer) battery, a nickel-cadmium (NiCad) battery etc.

Figure 2A:
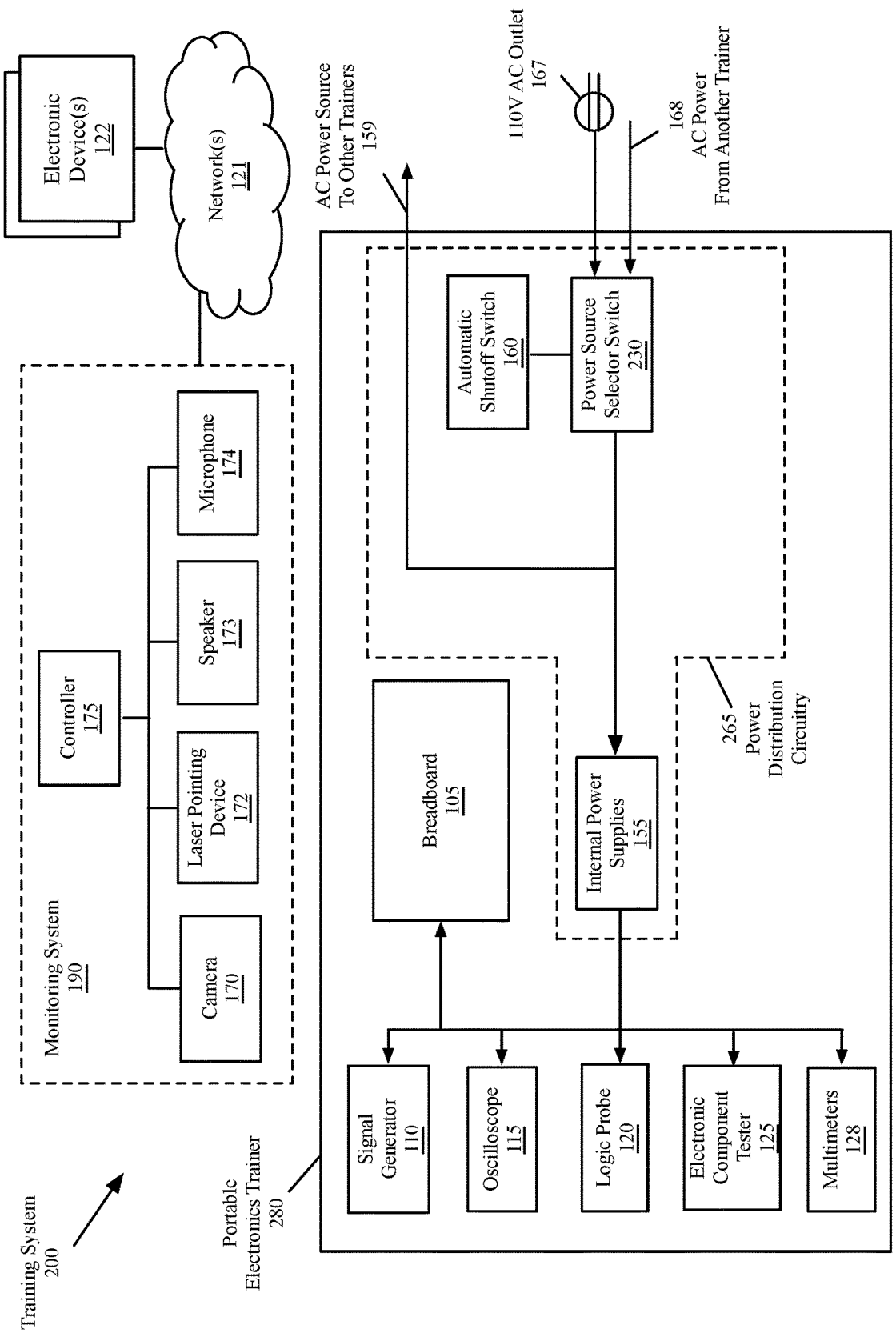
FIG. 2A is a functional block diagram illustrating a training system that includes an electronics trainer that may receive power from other trainers, may provide power to other trainers, and/or may provide control signals to other trainers, according to various aspects of the present disclosure.
Figure 2B:
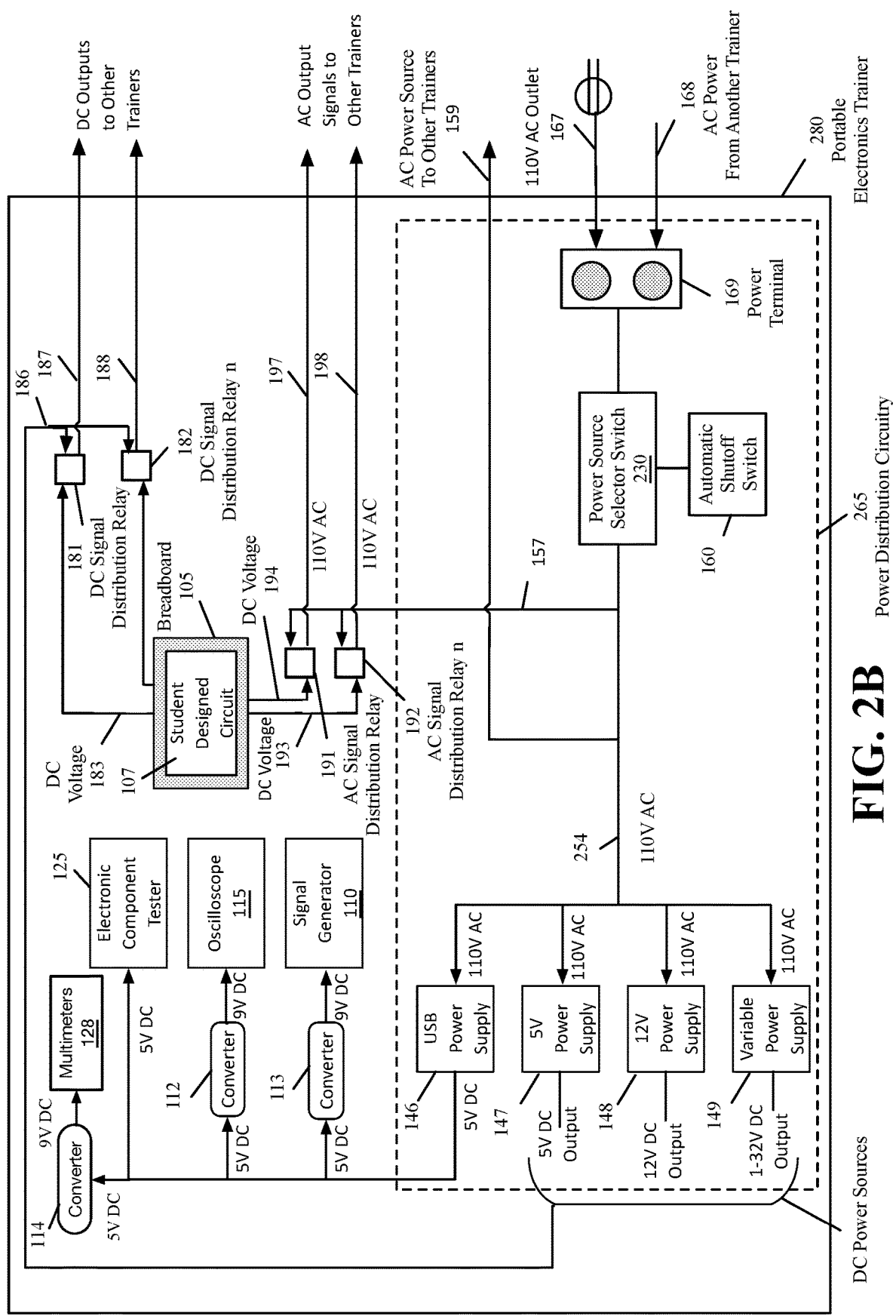
FIG. 2B is a functional diagram illustrating the interconnections of the electronics trainer of FIG. 2A, according to various aspects of the present disclosure.
Figure 3A:
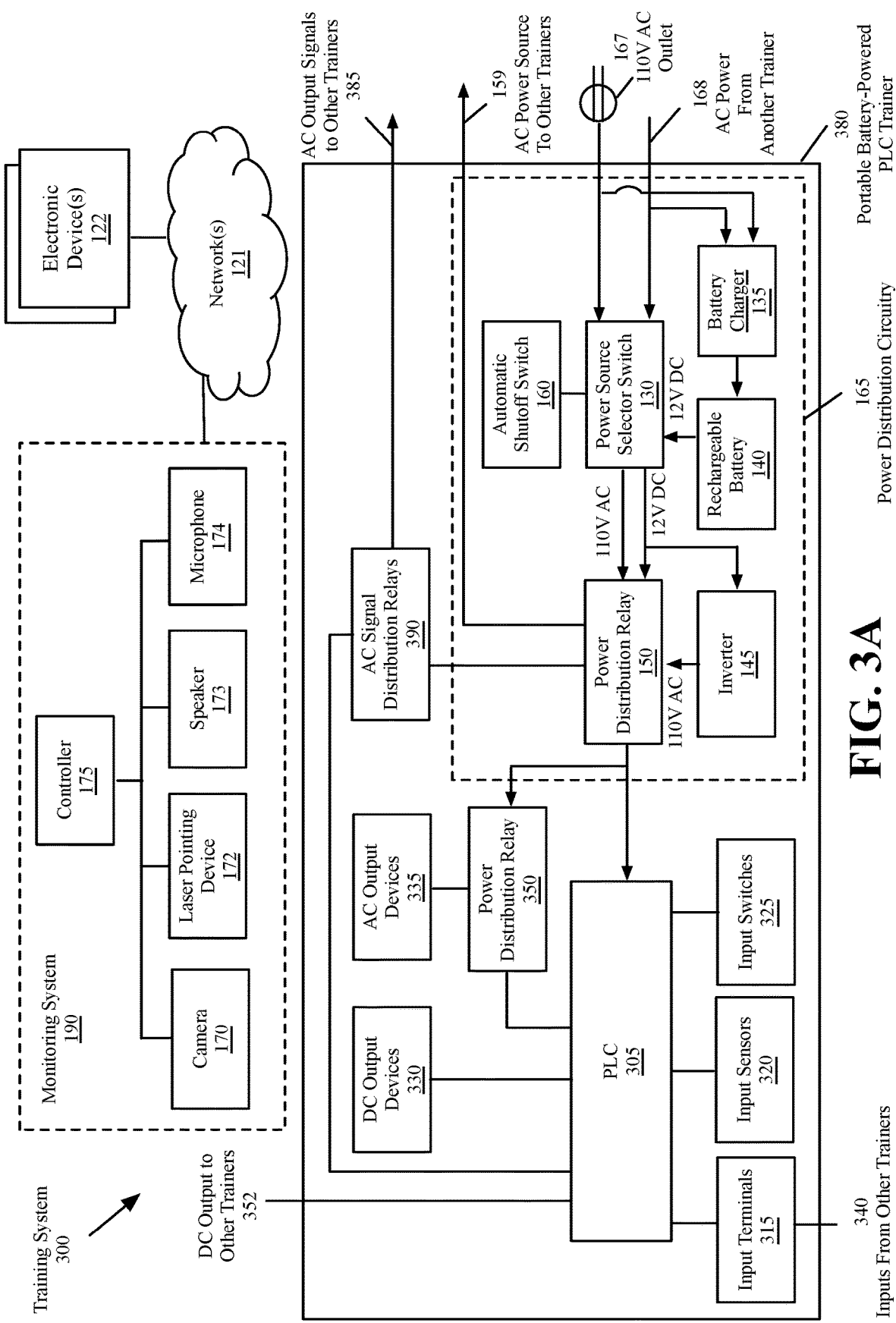
FIG. 3A is a functional block diagram illustrating a training system that includes a PLC trainer that may operate on battery power, may receive power from other trainers, may provide power to other trainers, may receive control signals from other trainers, and/or may provide control signals to other trainers, according to various aspects of the present disclosure.
Figure 3B:
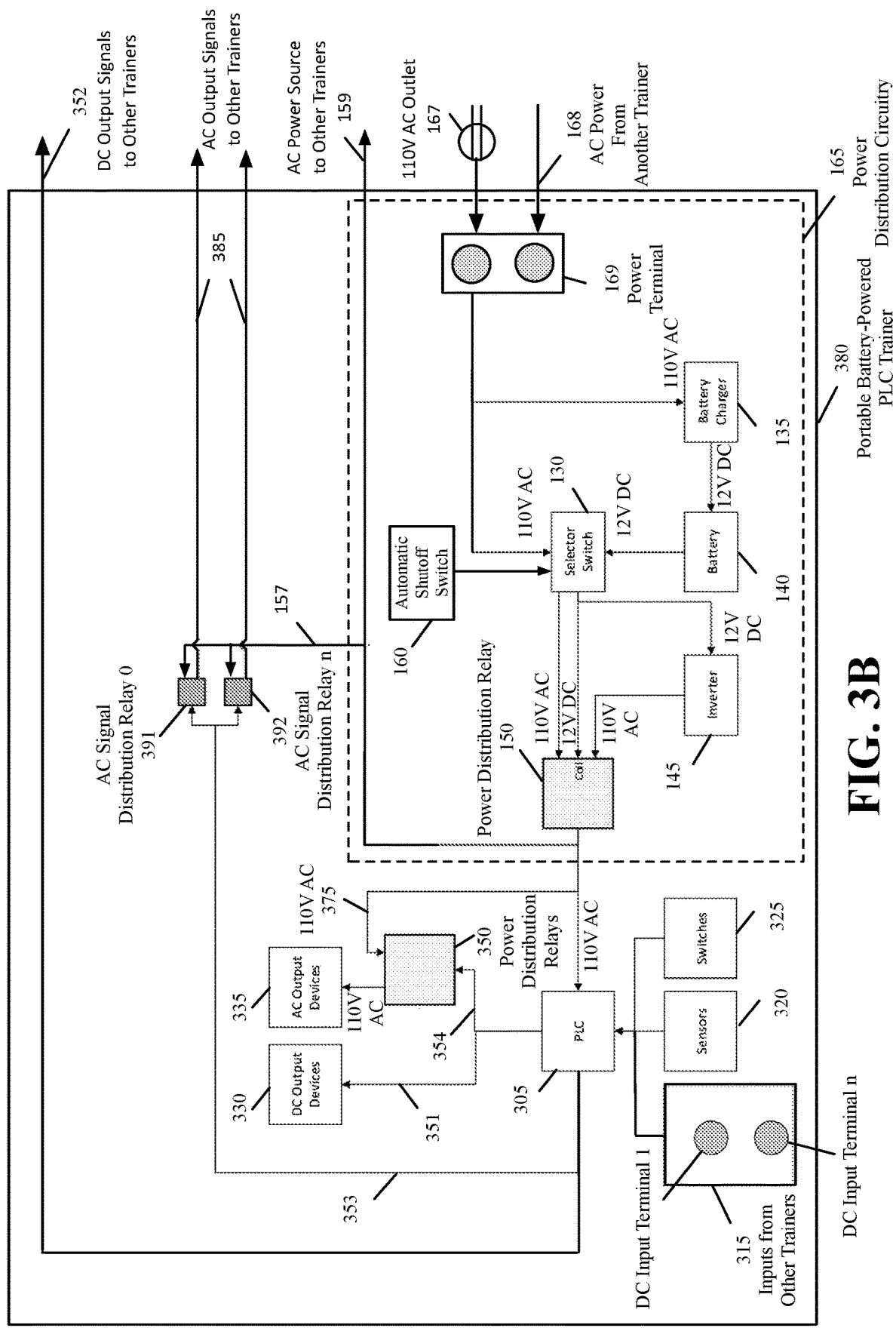
FIG. 3B is a functional diagram illustrating the interconnections of the PLC trainer of FIG. 3A, according to various aspects of the present disclosure.
Figure 4A:
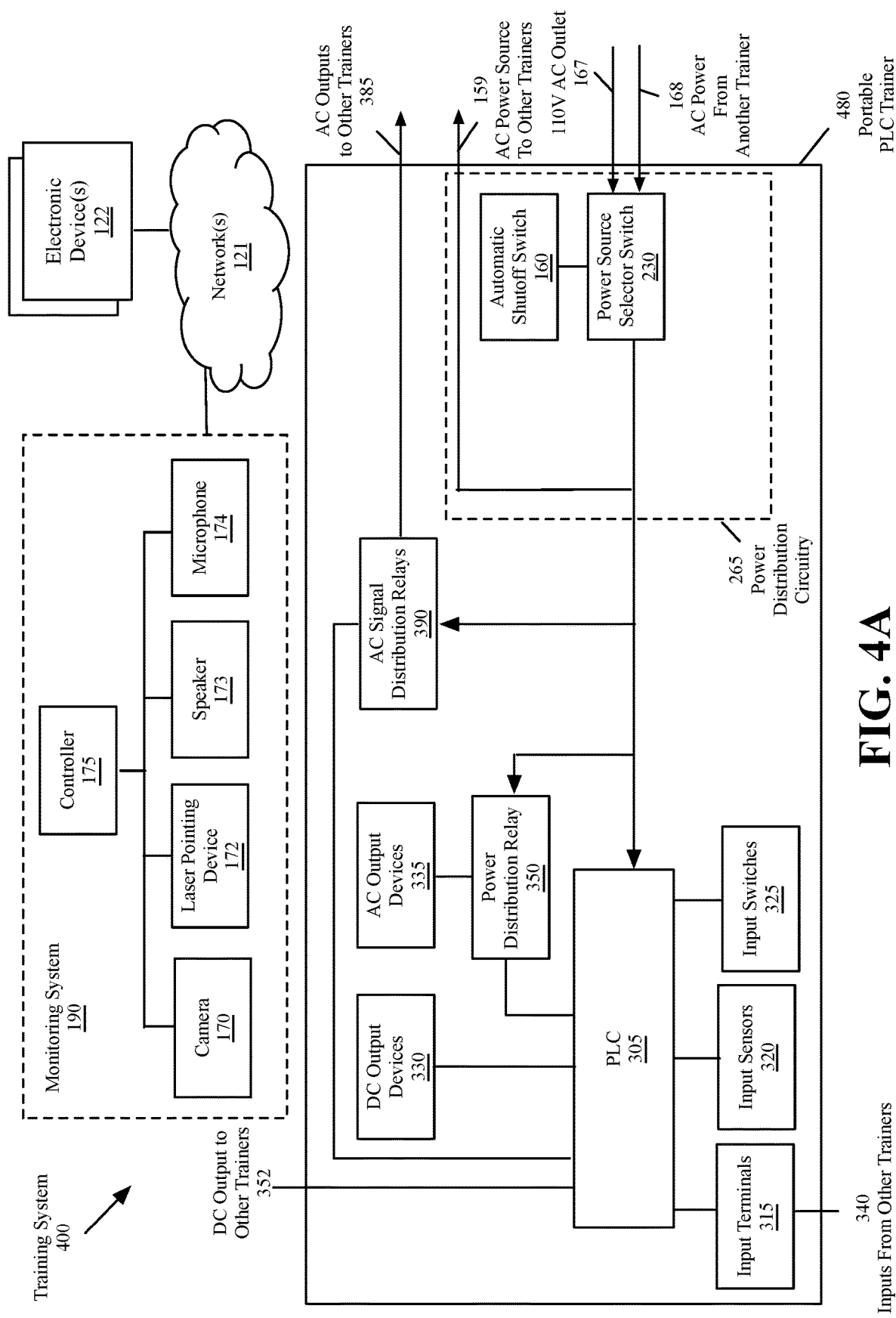
FIG. 4A is a functional block diagram illustrating a training system that includes a PLC trainer that may receive power from other trainers, may provide power to other trainers, may receive control signals from other trainers, and/or may provide control signals to other trainers, according to various aspects of the present disclosure.
Figure 4B:
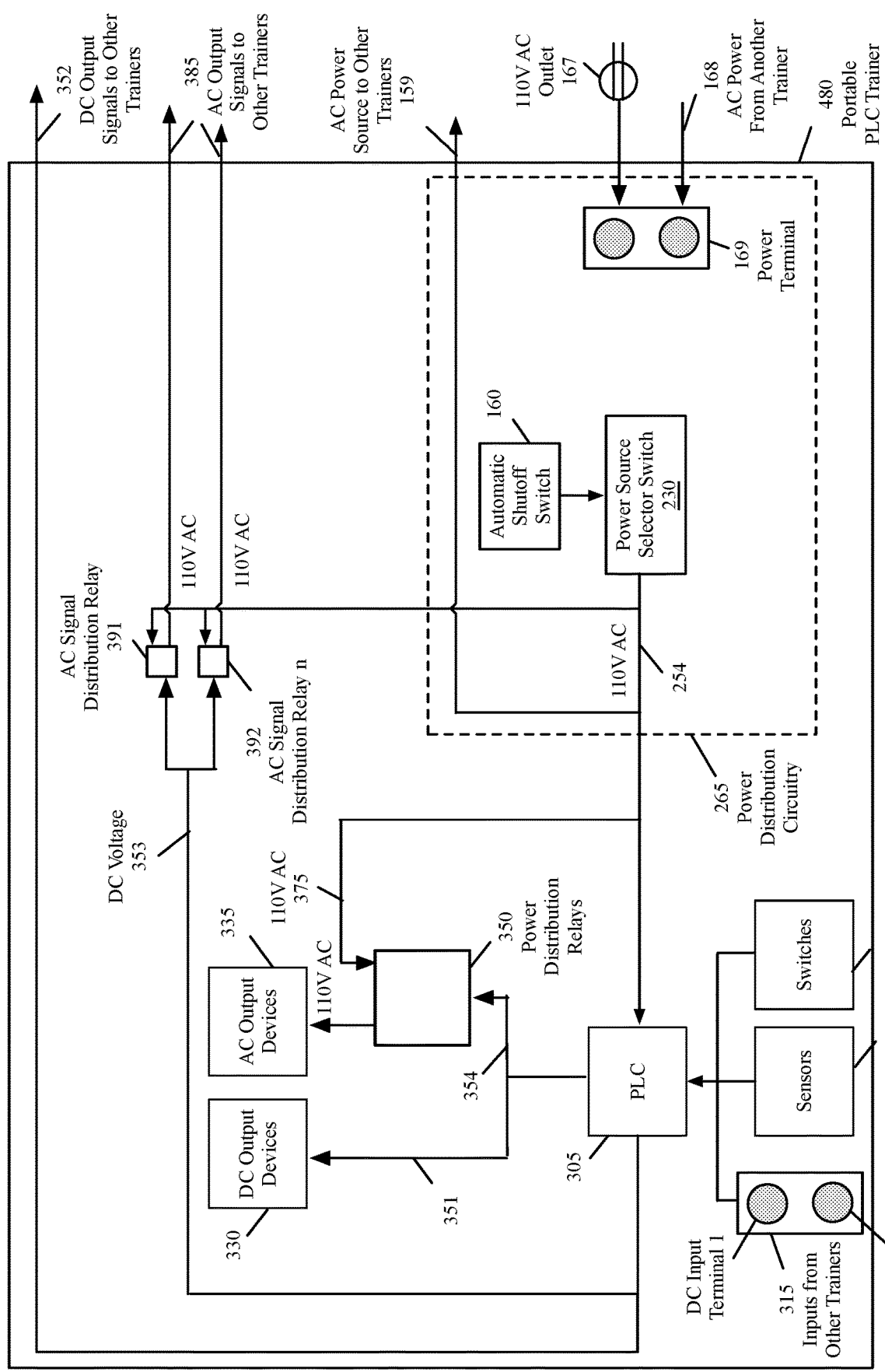
FIG. 4B is a functional diagram illustrating the interconnections of the PLC trainer of FIG. 4A, according to various aspects of the present disclosure.
Figure 5A:
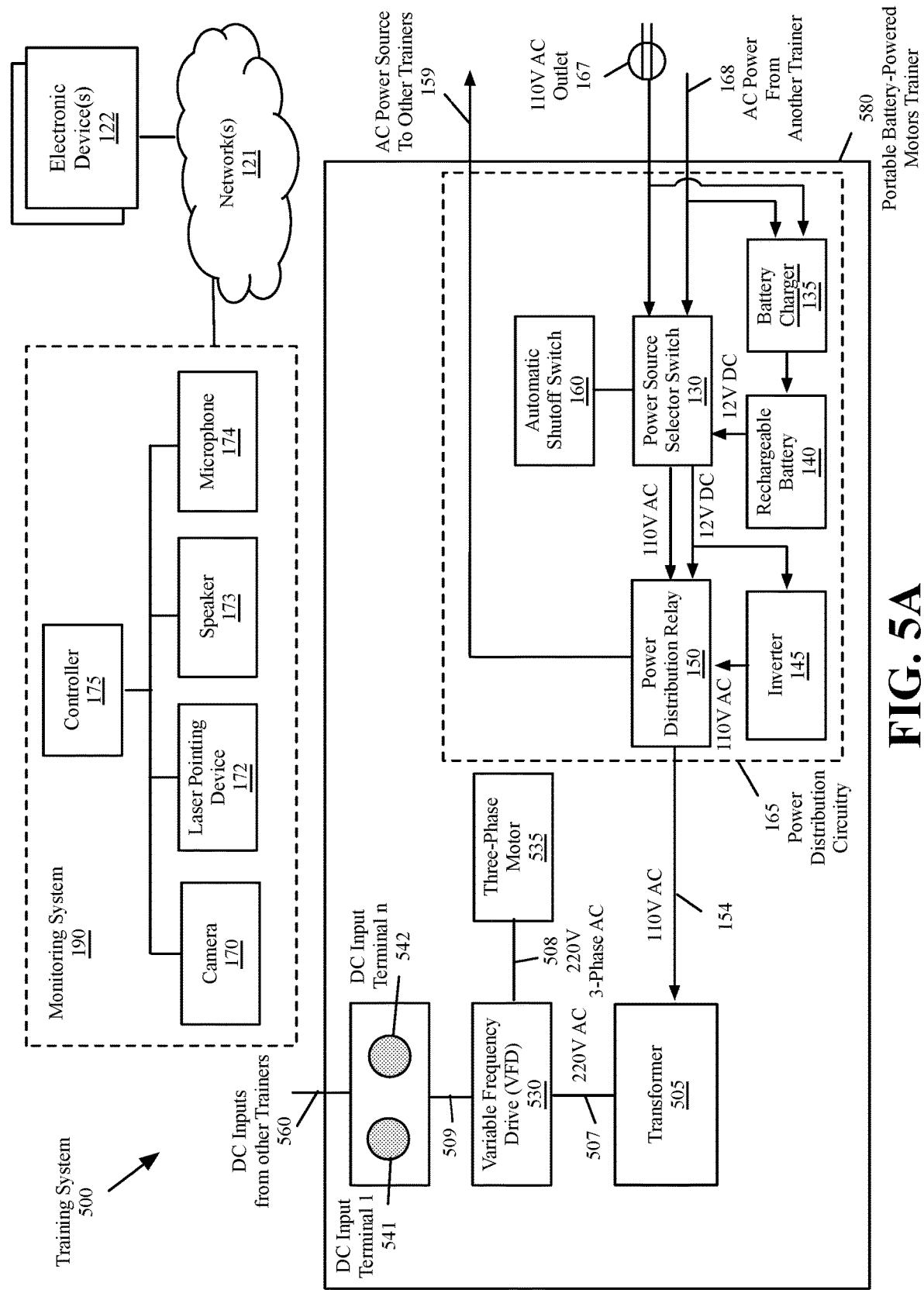
FIG. 5A is a functional block diagram illustrating a training system that includes a motors trainer that may that operate on battery power, may receive power from other trainers, may provide power to other trainers, and/or may receive control signals from other trainers, according to various aspects of the present disclosure.
Figure 5B:
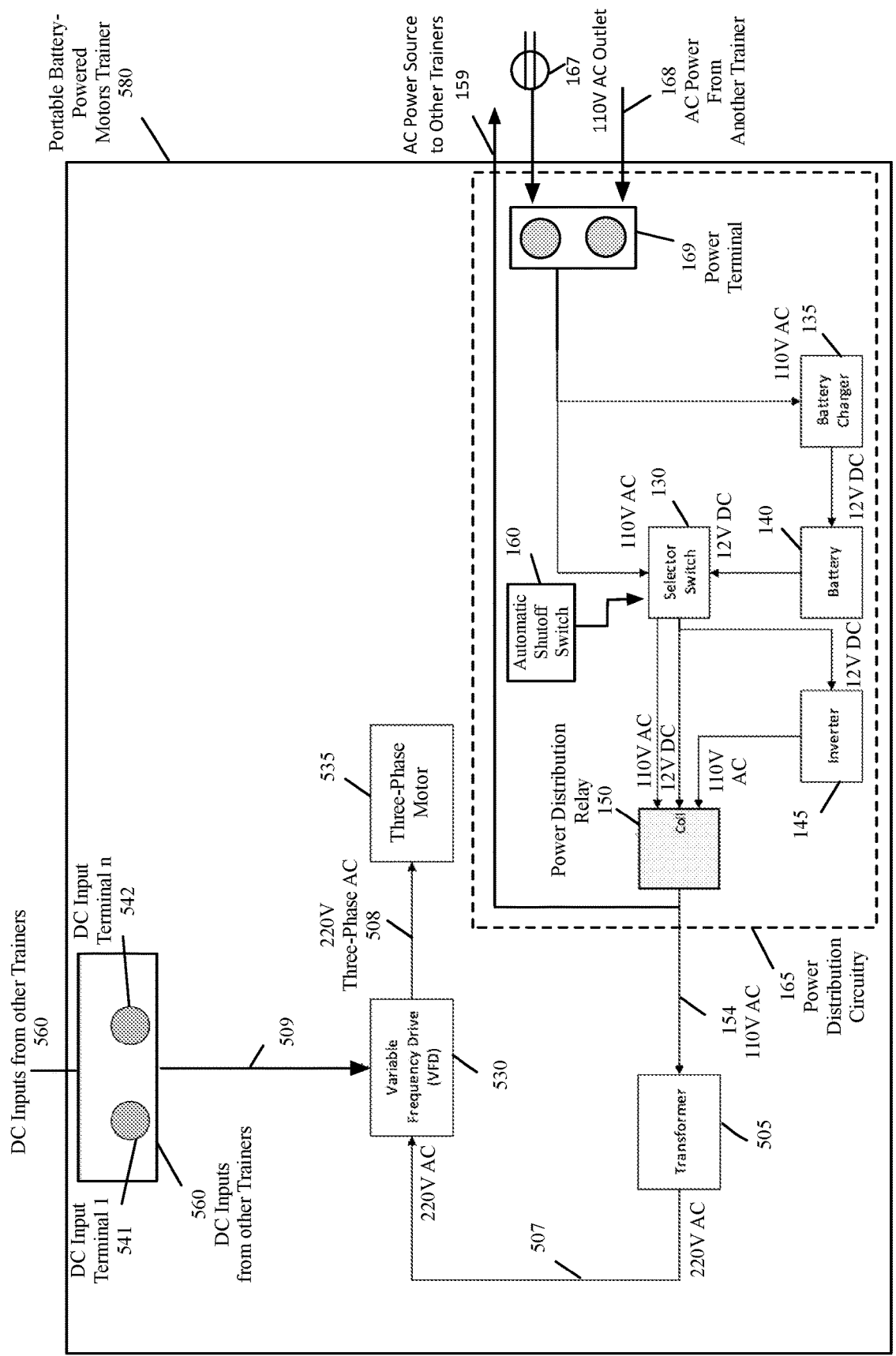
FIG. 5B is a functional diagram illustrating the interconnections of the motors trainer of FIG. 5A, according to various aspects of the present disclosure.
Figure 6A:
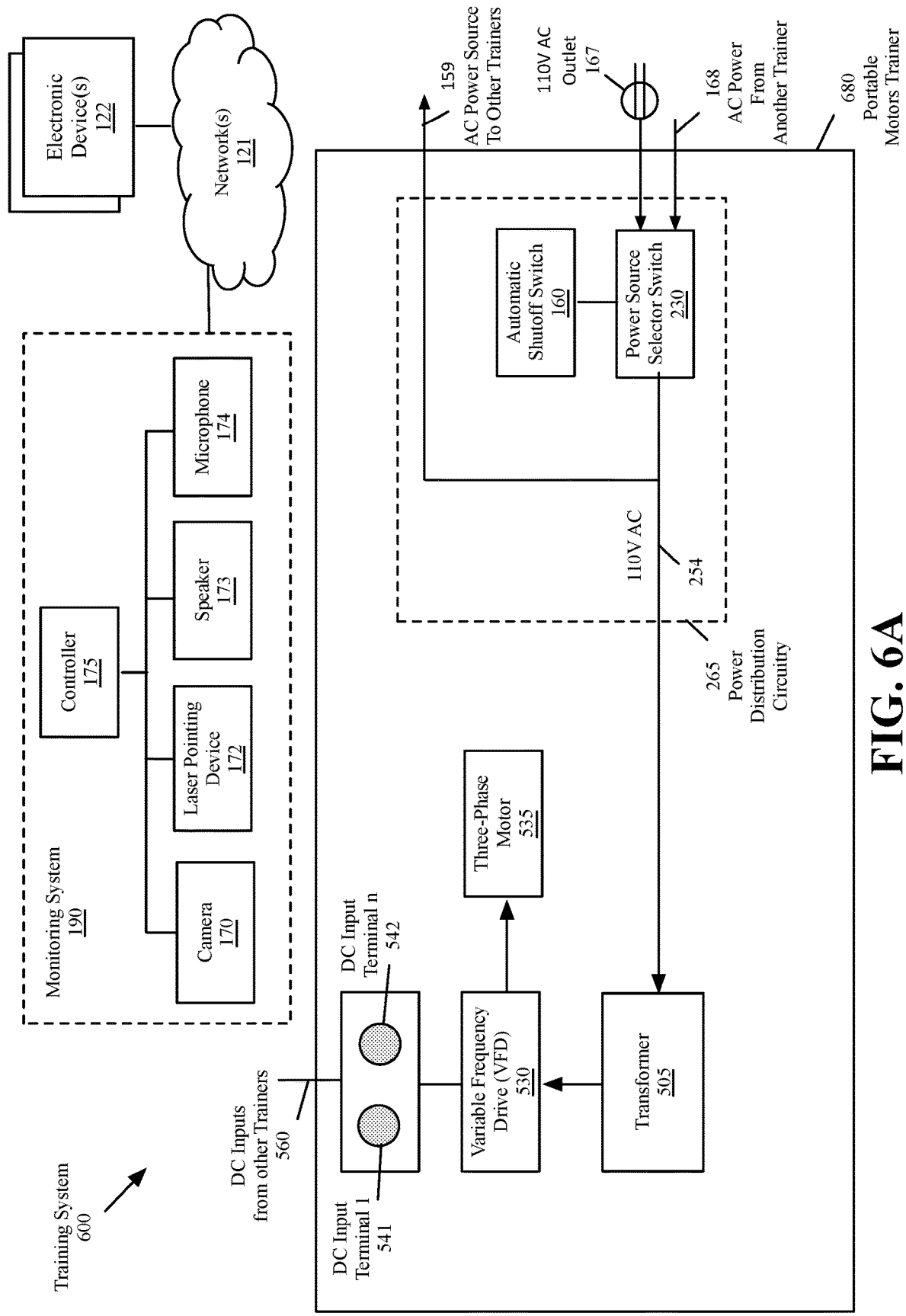
FIG. 6A is a functional block diagram illustrating a training system that includes a motors trainer that may receive power from other trainers, may provide power to other trainers, and/or may receive control signals from other trainers, according to various aspects of the present disclosure.
Figure 6B:
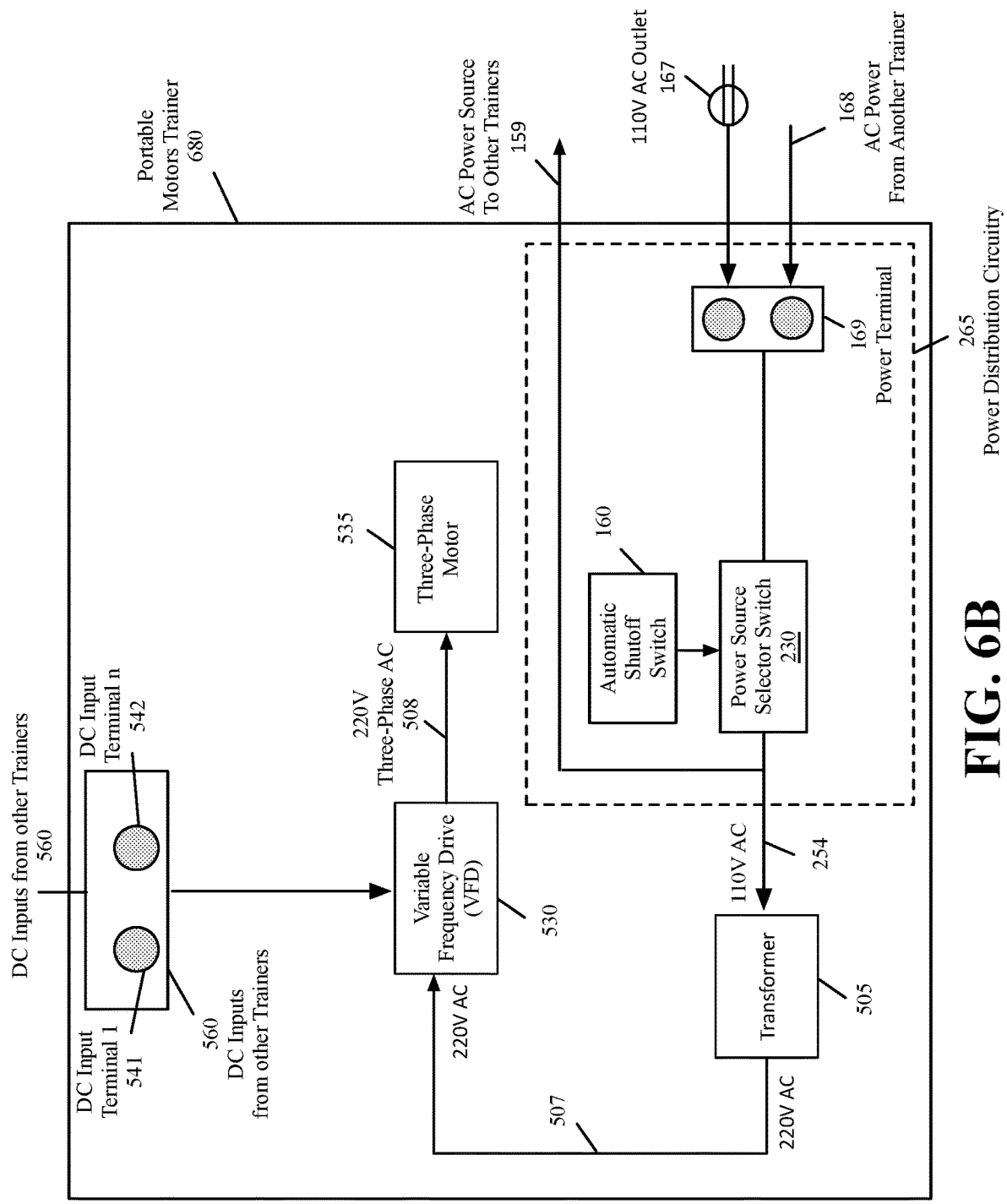
FIG. 6B is a functional diagram illustrating the interconnections of the motors trainer of FIG. 6A, according to various aspects of the present disclosure.
Figure 8A:
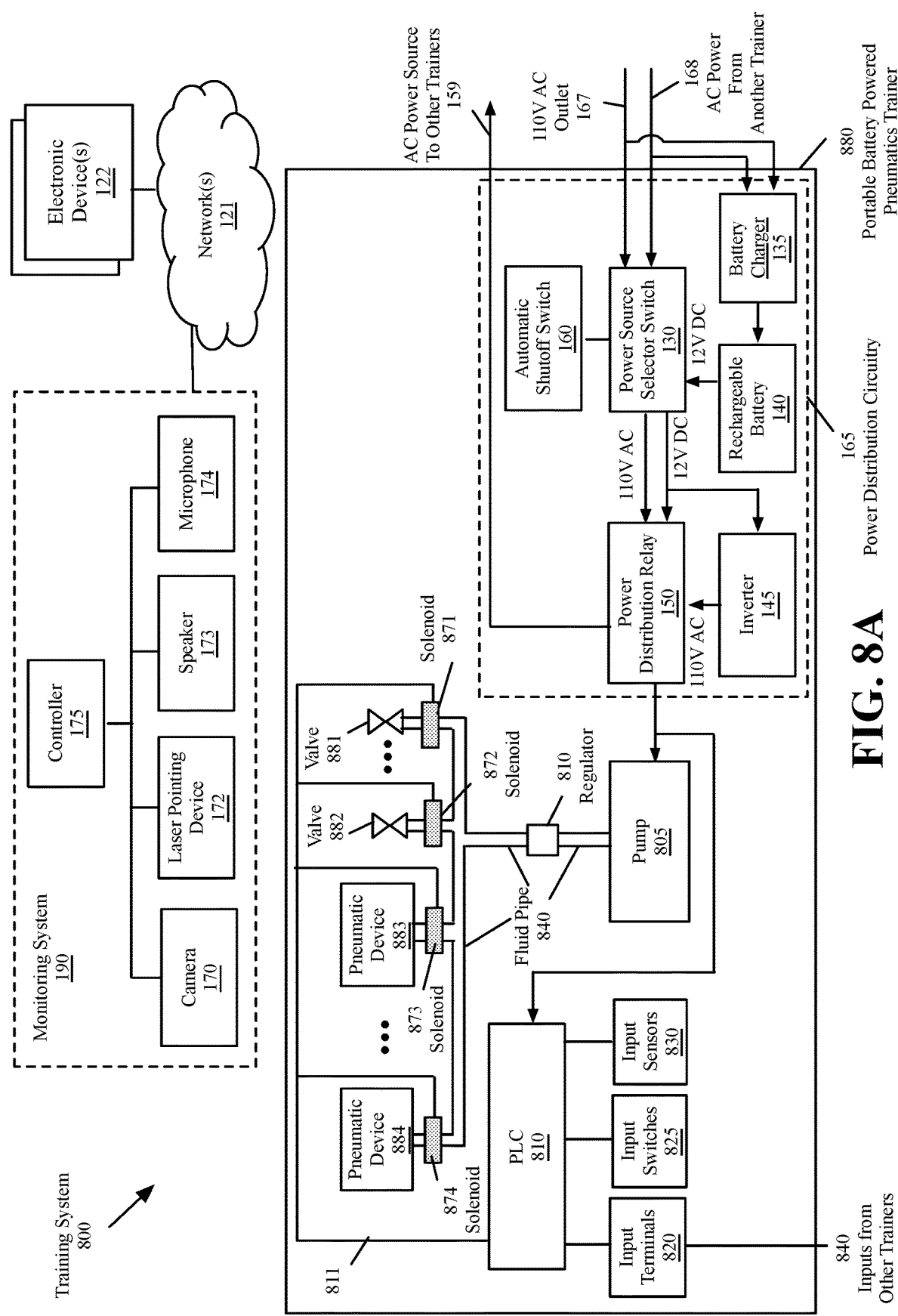
FIG. 8A is a functional block diagram illustrating a training system that includes a pneumatics trainer that that may operate on battery power, may receive power from other trainers, may provide power to other trainers, and/or may receive control signals from other trainers, according to various aspects of the present disclosure.
Figure 8B:
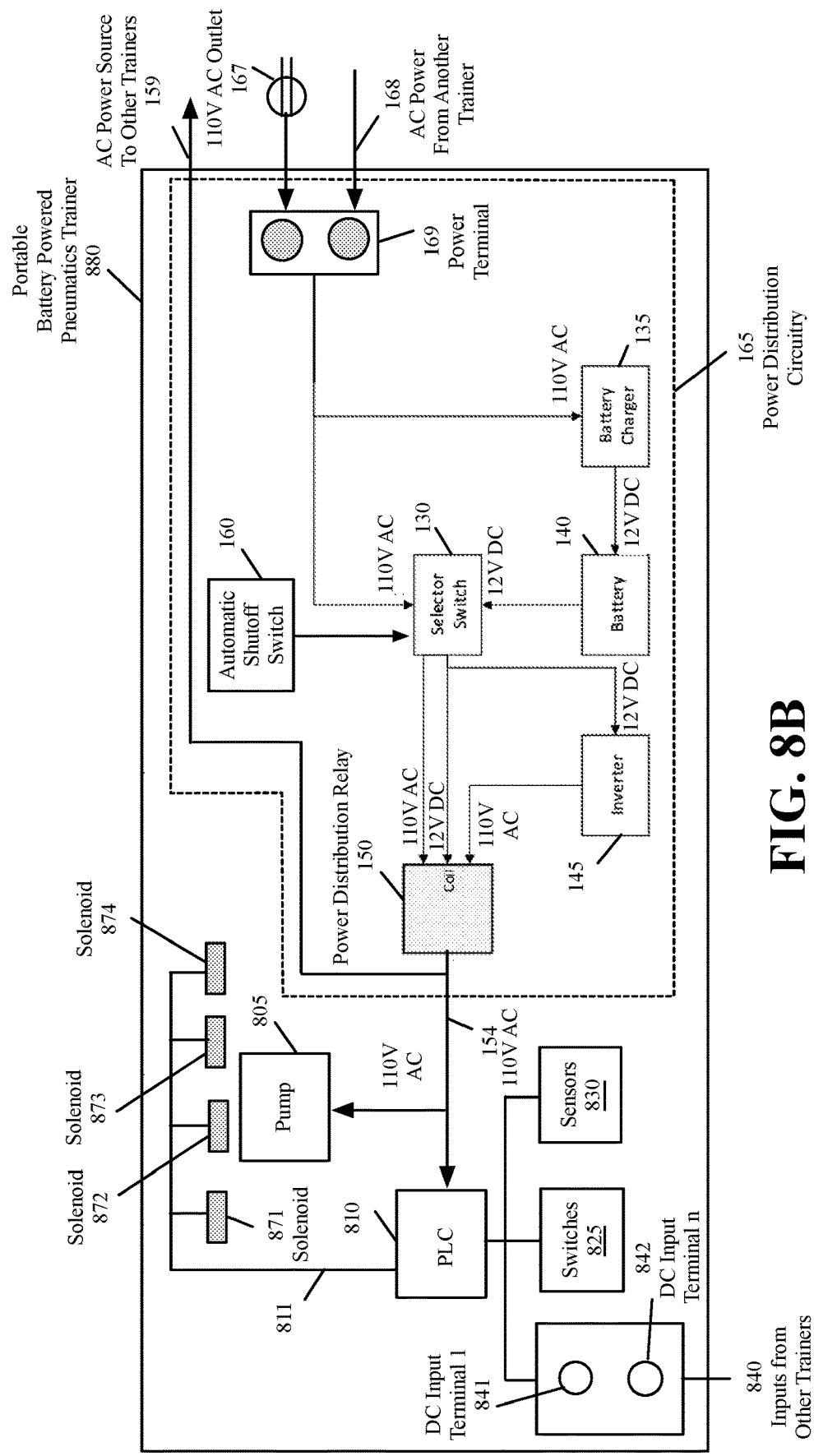
FIG. 8B is a functional diagram illustrating the interconnections of the pneumatics trainer of FIG. 8A, according to various aspects of the present disclosure.
Figure 9A:
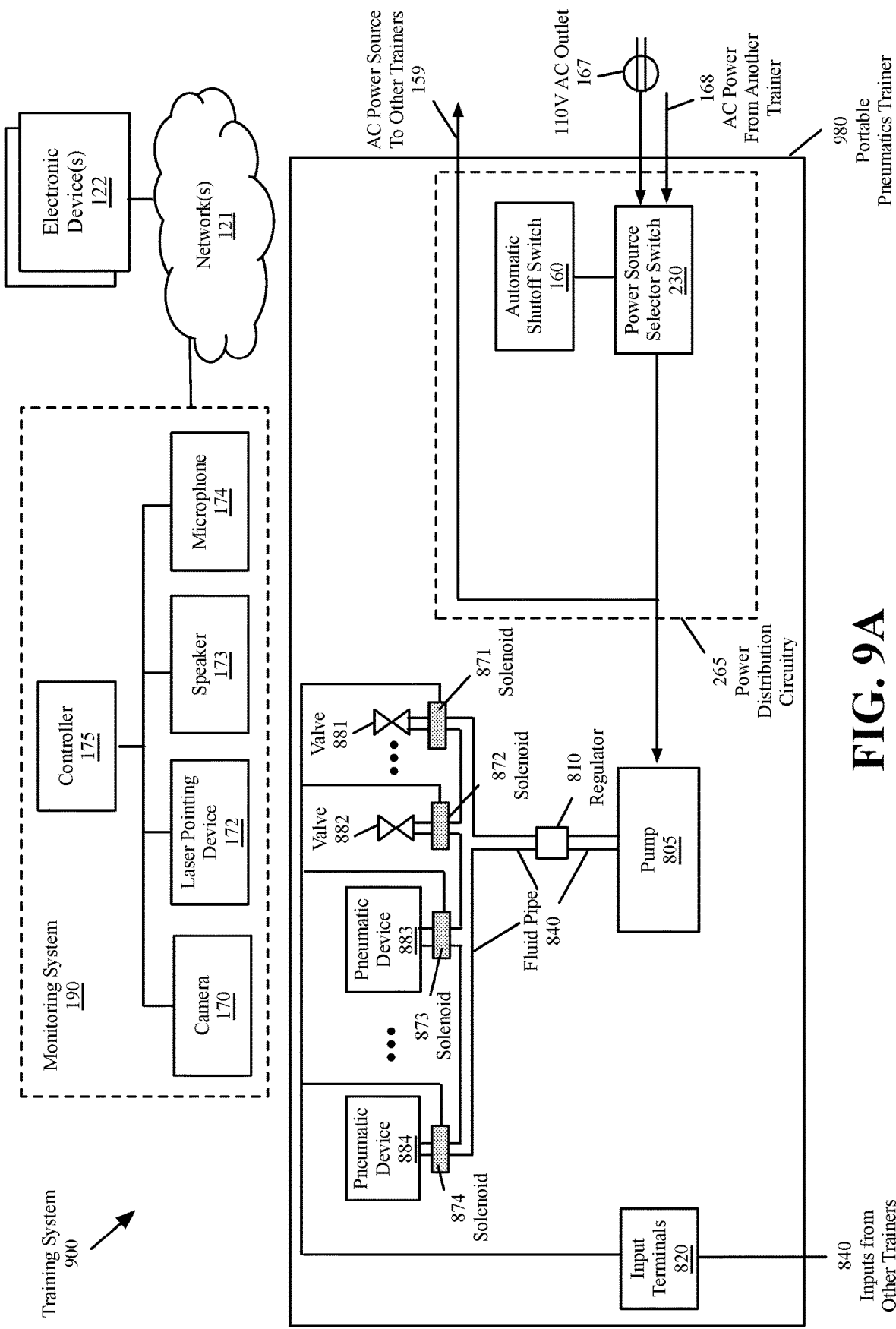
FIG. 9A is a functional block diagram illustrating a training system that includes a pneumatics trainer that may receive power from other trainers, may provide power to other trainers, and/or may receive control signals from other trainers, according to various aspects of the present disclosure.
Figure 9B:
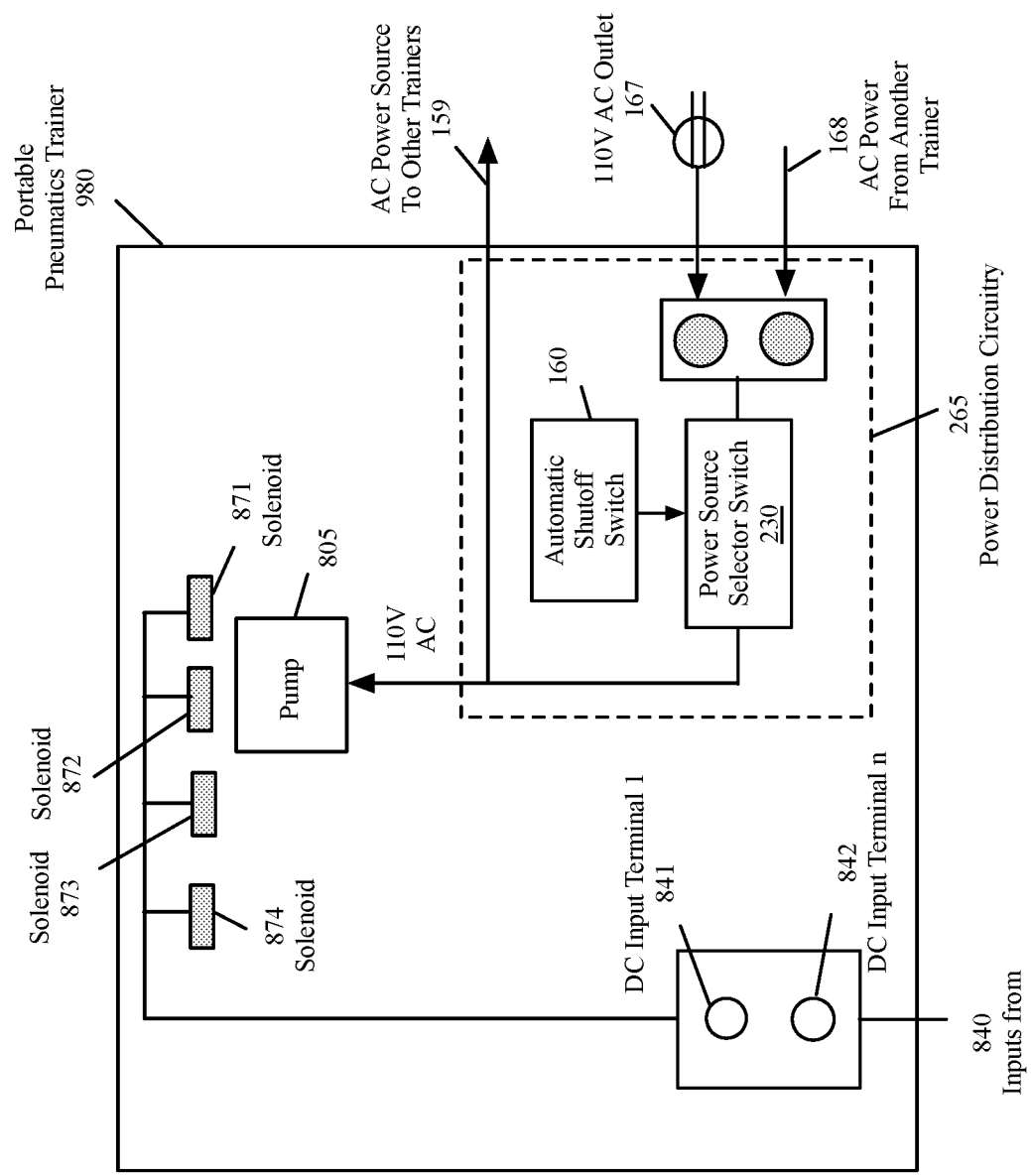
FIG. 9B is a functional diagram illustrating the interconnections of the pneumatics trainer of FIG. 9A, according to various aspects of the present disclosure.

The trainers, in some embodiments, such as the electronics trainer of FIGS. 2A-2B, the PLC trainer of FIGS. 4A-4B, the motors trainer of FIGS. 6A-6B, and pneumatic trainer of FIGS. 9A-9B may receive AC power either from other trainers or from an AC outlet. The trainers, in some embodiments, such as the motors trainer of FIG. 7, may receive power as an AC control signal from another trainer. The trainers of FIGS. 1A-6B and 8A-9B may provide AC power to other trainers.

The trainers, in some embodiments, such as the electronics trainer of FIGS. 2C-2D, the PLC trainer of FIGS. 4C-4D, the motors trainer of FIGS. 6C-6D, and some of the pneumatic trainers described below, may operate an internal battery or a power bank. These trainers do not use external AC power sources and may generate the AC and DC voltages that are needed by different components of the trainer from the voltage generated by the internal rechargeable battery or the power bank.

The AC voltage may be generated, from the internal battery or the power bank, through an inverter. Different levels of DC voltage may be generated, from the internal battery or the power bank, through DC-to-DC voltage converters. These trainers may continue to operate as long as their battery, or the power bank, has charge. The rechargeable battery, or the power bank, may be charged through a recharging connector, such as, for example, and without limitations, a Universal Serial Bus (USB) connection. The rechargeable battery, or the power bank, may continue to operate while being recharged. The battery may be a rechargeable battery, such as, for example, and without limitations, a Li-ion battery, a LiPo battery, a NiCad battery, etc. The power bank may be a power bank, such as, for example, and without limitations, a Li-ion power bank, a LiPo power bank, a NiCad power bank, etc.

The portable case of the battery operated trainers of FIGS. 1A-1B and 2C-2D, the PLC trainer of FIGS. 3A-3B and 4C-4D, the motors trainer of FIGS. 5A-5B and 6C-6D, and pneumatic trainer of FIGS. 8A-8B, in some embodiments, may include wireless charging capability and may include a receiver built into the case. The receiver may include a magnetic contact point and an external pad that may be connected to an AC outlet. The external pad may be magnetically attached to the outside of the case at a magnetic contact point. When contact is made and the external pad is plugged in, a voltage may be generated by magnetic induction, which may charge the battery. In these embodiments, the trainer's battery may be charged while the case is closed. In some embodiments, the case may be slid into a shelf where the shelf may have metal contact points that may align with the magnetic contact on the case to charge the battery.

With further reference to FIG. 1B, the power distribution relay 150, which may include a coil 158, is an electrically operated switch. The power distribution relay 150 may include a selector input 151, two AC input ports 152 and 153, and an AC output port 154. Depending on the level of voltage at the selector input 151 (e.g., logical high or logical low) one of the AC input ports 152 and 153 may be connected to the output 154.

The power source selector switch 130 may be used to control the source used to power the trainer. The power source selector switch 130 may receive AC power 131 (e.g., 110 V AC) from either the AC outlet 167 or from another trainer (as shown by 168), for example, through a power terminal 169 (FIG. 1B). The AC power, either from the AC outlet or from another trainer, may also be supplied to the battery charger 135, which in turn may charge the battery 140. The DC output 142 from the battery 140 may be inputted to the power source selector switch 130. The power terminal 169 may be, for example, and without limitations, a two-way switch that may connect either the AC outlet 167 or the AC power 168 from another trainer to the automatic shutoff switch 160 and the power switch 130.

The power source selector switch 130 may have a setting to allow the trainer 180 to receive AC power from the power terminal 169 (the external AC power mode). The selector switch 130 may have a setting to allow the trainer 180 to run on the internal battery 140 (the battery mode). The selector switch 130, in some embodiments, may have a setting to disconnect all power from the trainer (the "all off mode"). The operation of each mode is described below.

The power source selector switch 130 uses the selector input 151 of the power distribution relay 150 to select whether the power distribution circuitry 165 provides AC power to the other components of the trainer 180 from an external source or from an internal source. In the external AC power mode setting, the power source selector switch 130 sets the logical DC signal 151 such that the power distribution relay 150 may connect the 110 V AC input port 152 (i.e., the AC input received from an external source) to the relay's output 154. For example, in this setting, the power source selector switch 130 may not connect the input 142 it receives from the battery 140 to the input 151 of the relay 150, resulting in the DC signal 151 to be set to a logical low voltage in order to select the AC input port 152 to be connected to the output port 154 of the relay 150.

In the battery mode, the power source selector switch 130 may connect the DC input 142 received from the battery 140 to the output port 137. The output port 137 supplies the DC power to the inverter 145 input 139. The output port 137 also supplies the DC signal 151 to the selector input of the power distribution relay 150. The inverter 145 may convert the DC input 139 to an AC output and may supply the AC output to the AC input port 153 of the power distribution relay 150. In this mode, the selector input 151 of the power distribution relay 150 may be set to the battery voltage (e.g., logical high), which may cause the power distribution relay 150 to connect the AC input received at the AC input port 153 from the inverter 145 to the output port 154. In this mode, the AC power provided by the power distribution circuitry 165 to the other components of the trainer 180 is generated by the inverter 145 using the battery 140 power.

In the "all off mode," the selector switch 130 may disconnect both the AC output port 152 and the DC output port 137, resulting in the power distribution relay 150 not receiving AC power from either the external AC power sources or from the inverter 145. The power distribution circuitry 165 may include an automatic shutoff switch 160, which may be a micro-switch configured to cut off all power (e.g., by setting the power source selector switch 135 to the "all off mode"), when the lid of the portable case of the trainer 180 is closed.

With further reference to FIG. 1B, the AC output port 154 of the relay 150 may be provided as power source 159 to one or more other trainers (e.g., as described below with reference to FIGS. 10A-10B). Accordingly, the trainers of some embodiments may be able to receive power (through the power input 168) from other trainers and/or may supply power to other trainers (through the AC power output 159). The AC power source 159 to other trainers may be connected to a set of output terminals on the portable case of the trainer 180, which may be used to provide the AC power source 159 to other trainers. The AC power output from a trainer to other trainers, in some embodiments, may take the form of a standard outlet adapter that may be built into the outside of the portable case of the trainer. For example, the outside of the portable case of the trainers, in some embodiments, may include a standard power outlet, which may provide the AC power output from the trainer. The power terminal 169, in some embodiments, may be configured to have a proprietary connector/port that may allow for a custom power cord design, where one end of the power cord may be connected into the proprietary connector/port of the power terminal 169 and the other end may be inserted into a standard outlet port. The standard outlet port may be either an AC power outlet in a lab, in a home, etc., (commonly referred to as a wall outlet) or the standard power outlet on the outside of the portable case of another trainer.

The AC output port 154 of the relay 150 may be provided to one or more internal DC power sources 147-149 and one or more internal USB power supplies 146. The internal DC power sources 147-149 may receive the AC power through the power distribution relay 150 and may generate fixed (147-148) or variable (149) DC outputs. The variable DC output 149, in some embodiments, may output a variable DC voltage based on the user setting on a knob.

The internal USB power supplies 146 (only one is shown) may receive AC input and may output a DC output through a USB port. In the example of FIG. 1B, some of the components, such as the electronic component tester 125, may receive power from the USB power output of the USB power supply 146. The output of the USB power supply 146 may be amplified by the DC-to-DC voltage converters 112-114 to supply to other components, such as the oscilloscope 115, the signal generator 110, and the multimeters 128. It should be noted that, the signal generator 110, the oscilloscope 115, the electronic component tester 125, and/or the multimeters 128 may either receive power from one of the internal power sources 147-149 or from one of the internal USB power supplies 146, depending on type of their power input connections.

With continued reference to FIG. 1B, the breadboard 105 may be used to design a circuit 107, for example, by a student using the trainer 180 for learning electronics. The trainer 180 may include one or more DC signal distribution relays 181-182. Each DC signal distribution relay 181-182 may include two input ports and an output port. Each DC signal distribution relay 181-182 may receive a first electrical signal (e.g., a DC voltage) at the first input port and a second electrical signal (e.g., a control signal) at the second input port. Depending on the level of the control signal (e.g., logical high or logical low) at the second input, a DC signal distribution relay may connect or disconnect the first electrical signal to or from the corresponding output port.

The circuit 107 may be designed such that one or more DC voltages 183-184 (e.g., outputs from the circuit 107) may be used to provide control signals to the DC signal distribution relays 181-182. As shown, the first input port of a DC signal distribution relay 181-182 may receive a DC voltage inputs from one or more DC power sources 147-149. Although only one input line 186 is shown to come from the DC power sources 147-149, different DC signal distribution relay 181-182 may receive input from different DC power sources 147-149.

The second input port of a DC signal distribution relay 181-182 may receive a DC voltage 183-184 from the circuit 107. Depending on the voltage level of the DC voltages 183-184 (e.g., logical high or logical low), a DC signal distribution relay 181-182 may connect or disconnect the DC input 186 to the corresponding output port. As shown, the output ports of the DC signal distribution relay 181-182 may be connected to the DC outputs 187-188 of the electronic trainer 180. The DC outputs 187-188 may be connected to a set of output terminals on the portable case of the electronic trainer 180, which may be used to provide the DC outputs 187-188 to other trainers (e.g., as described below with reference to FIG. 11).

The trainer 180 may include one or more AC signal distribution relays 191-192. Each AC signal distribution relay 191-192 may include two input ports and an output port. Each AC signal distribution relay 191-192 may receive a first electrical signal (e.g., an AC voltage) at the first input port and a second electrical signal (e.g., a control signal) at the second input port. Depending on the level of the control signal (e.g., logical high or logical low) at the second input port, an AC signal distribution relay may connect or disconnect the first electrical signal to or from the corresponding output port.

As shown, the first input port of an AC signal distribution relay 191-192 may receive AC power 157 from the power distribution relay 150. The circuit 107 may be designed such that one or more DC voltages 193-194 may be used to provide control signals to one or more AC signal distribution relays 191-192. The second input port of a AC signal distribution relay 191-192 may receive a DC voltage 193-194 from the student designed circuit 107. Depending on the voltage level of the DC voltages 193-194 (e.g., logical high or logical low), an AC signal distribution relay 191-192 may connect or disconnect the AC input 157 to the corresponding output port. As shown, the output ports of the AC signal distribution relays 191-192 are connected to the AC control outputs 197-198 of the electronic trainer 180. The AC control outputs 197-198 may be connected to a set of output terminals on the portable case of the trainer 180, which may be used to provide AC outputs 197-198 to other trainers (e.g., as described below with reference to FIG. 11).

With reference to FIG. 1A, the training system 100 may include the monitoring system 190 that may be used by an instructor and/or by an exam proctor to monitor the trainer 180 and/or to provide feedback to the person using the trainer 180. The monitoring system 190 may include a camera 170 that may be set to capture video from the breadboard and other components of the trainer 180. The video captured by the camera may be transmitted through one or more networks 121 to one or more remote electronic devices 122 used by instructors, proctors, etc. The captured video may be transmitted through wired and/or wireless connections to the remote electronic devices 122.

The speaker 173 and the microphone 174 may be used for communication between the person using the trainer and the person(s) at the remote electronic device(s) 122 who is/are watching the captured video. The light pointer 172 (e.g., a laser pointing device) may be used by a person at a remote electronic device 122 to point to different locations on the trainer 180. For example, the person using the trainer 180 may have a question or may have an issue with setting up the connections for the user designed circuit on the breadboard 105. An instructor may use the light pointer 172 to point to where there is an issue in the set up.

The monitoring system 190 of the present embodiments provides the technical advantage over the prior art trainers where an instructor had to be either physically present in the lab where a student is using the trainer 180 or the student had to capture a video (e.g., using a smartphone) to show the circuit to the instructor. The instructor had to then verbally describe which connection or which component needs to be added/changed/removed. The monitoring system 190 of the present embodiments allows the instructor to watch the video as the student is working on the student designed circuit and use the light pointer to point to an exact location on the trainer while providing instructions for how to modify the circuit.

The monitoring system 190 may also be used by proctors watching students taking an exam using the trainer 180. The monitoring system 190 of the present embodiments further provides the technical advantage of allowing a proctor to remotely watch the trainer 180 and to provide instructions using the light pointer 172, the speaker 173, and the microphone 174.

FIG. 2A is a functional block diagram illustrating a training system 200 that includes an electronics trainer that may receive power from other trainers, may provide power to other trainers, and/or may provide control signals to other trainers, according to various aspects of the present disclosure. FIG. 2B is a functional diagram illustrating the interconnections of the electronics trainer of FIG. 2A, according to various aspects of the present disclosure.

With reference to FIG. 2A, the training system 200 may include a monitoring system 190, which may be similar to the monitoring system 190 of FIG. 1A. The training system 200 may include a portable electronics trainer 280. With reference to FIGS. 2A-2B, the portable electronics trainer 280 may be in a portable box that may be similar to the portable box described above with reference to the trainer 180 of FIGS. 1A-1B. The portable electronics trainer 280 may include, inside the portable box, a breadboard 105 and one or more of the followings: a signal generator 110, an oscilloscope 115, a logic probe 115, an electronic component tester 125, and a plurality of multimeters 128, which may be similar to the corresponding components of FIGS. 1A-1B.

The portable electronics trainer 280 may include a power distribution circuitry 265. The power distribution circuitry 265 may include a power terminal 169, a power source selector switch 230, and an automatic shutoff switch 160. The power terminal 169 and the automatic shutoff switch 160 may, respectively, be similar to the power terminal 169 and the automatic shutoff switch 160 of FIG. 1B. The power source selector switch 230 of FIGS. 2A-2B may be a two-way switch to select between the external AC power mode (using either the AC outlet 167 or the AC power 168 from another trainer) or the "all off mode," described above The output 254 of the power source selector switch 230 may be 110 V AC. The trainer 280 may provide AC power 159, the AC control outputs 197-198, and/or the DC control signals 187-188 to other trainers, as described above with reference to FIGS. 1A-1B. The other components of FIG. 2B, may be similar to the corresponding components of FIG. 1B.

The trainer 280 provides the technical advantage of being capable of working without a battery and without being connected to the AC outlet. As described below with reference to FIG. 10A-10B, the trainer 280 may receive AC power 168 from another trainer, such as the trainer 180 of FIGS. 1A-1B. If the trainer 180 is set to battery mode and provides AC power to the trainer 280, both trainers may be operable without a need to be plugged in an AC outlet.

Figure 2C:
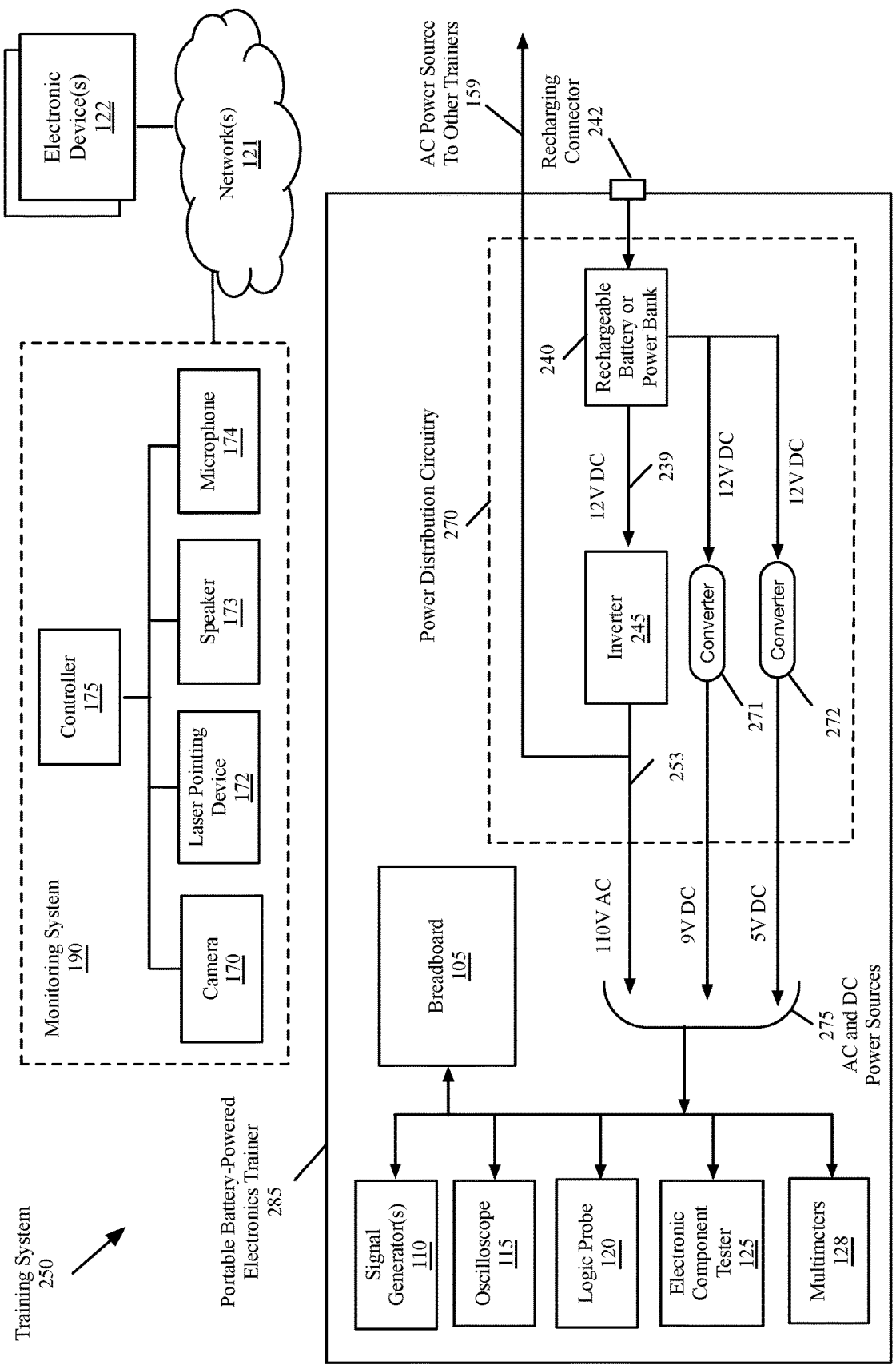
FIG. 2C is a functional block diagram illustrating a training system that includes an electronics trainer that may have a rechargeable battery (or a power bank) as the power source, may provide power to other trainers, and/or may provide control signals to other trainers, according to various aspects of the present disclosure.

FIG. 2C is a functional block diagram illustrating a training system 250 that includes an electronics trainer that may have a rechargeable battery (or a power bank) as the power source, may provide power to other trainers, and/or may provide control signals to other trainers, according to various aspects of the present disclosure. FIG. 2D is a functional diagram illustrating the interconnections of the electronics trainer of FIG. 2C, according to various aspects of the present disclosure.

With reference to FIG. 2C, the training system 250 may include a monitoring system 190, which may be similar to the monitoring system 190 of FIG. 1A. The training system 250 may include a portable electronics trainer 285. With reference to FIGS. 2C-2D, the portable electronics trainer 285 may be in a portable box that may be similar to the portable box described above with reference to the trainer 180 of FIGS. 1A-1B. The portable electronics trainer 285 may include, inside the portable box, a breadboard 105 and one or more of the followings: a signal generator 110, an oscilloscope 115, a logic probe 115, an electronic component tester 125, and a plurality of multimeters 128, which may be similar to the corresponding components of FIGS. 1A-1B.

The portable electronics trainer 285 may include a power distribution circuitry 270. The power distribution circuitry 270 may include a rechargeable battery (or a power bank) 240, an inverter 245, and one or more DC-to-DC voltage converters 271-272. The inverter 245 may convert the DC input 239 to an AC output 253 and may supply the AC output 253 to the other components of the trainer 285. The AC output 253 of the inverter 245 may be provided as power source 159 to one or more other trainers (e.g., as described below with reference to FIGS. 10A-10B).

The DC power sources 290 (FIG. 2D) with different levels of DC voltage may be generated from the internal battery or the power bank, through the DC-to-DC voltage converters 271-272. The trainer 285 may continue to operate as long as the rechargeable battery, or the power bank, 240 has charge. The rechargeable battery, or the power bank, 240 may be charged through a recharging connector 242, such as, for example, and without limitations, a USB connection. The other components of FIG. 2C, may be similar to the corresponding components of FIG. 1B.

The trainer 285 provides the technical advantage of providing the required working through an internal battery and without being connected to the AC outlet. The trainer 285 may continue to operate as long as the rechargeable battery, or the power bank, 240 has charge. As described below with reference to FIG. 10A-10B, the trainer 285 may provide AC power to other trainers, and all trainers may be operable without a need to be plugged in an AC outlet.

II. PLC Trainers

The instructional trainers of the present embodiments include PLC trainers. Some of the present embodiments provide a training system that includes a portable battery-powered instructional PLC trainer and an instructor's monitoring system. FIG. 3A is a functional block diagram illustrating a training system that includes a PLC trainer that may operate on battery power, may receive power from other trainers, may provide power to other trainers, may receive control signals from other trainers, and/or may provide control signals to other trainers, according to various aspects of the present disclosure. FIG. 3B is a functional diagram illustrating the interconnections of the PLC trainer of FIG. 3A, according to various aspects of the present disclosure.

A PLC is a digital computer that is typically used for control of industrial and manufacturing processes. A PLC may include a programmable memory used to store program instructions for performing the PLC's intended functions. A PLC may include a processor to execute the PLC's stored program, a power supply to convert AC voltage to DC voltage, memory to store data and/or the PLC's program, and an input/output (I/O) interface for sending and receiving data.

With reference to FIG. 3A, the training system 300 may include a monitoring system 190, which may be similar to the monitoring system 190 of FIG. 1A. The training system 300 may include a portable battery-powered PLC trainer 380. With reference to FIGS. 3A-3B, the portable PLC trainer 380 may be in a portable box that may be similar to the portable box described above with reference to the trainer 180 of FIGS. 1A-1B. The portable PLC trainer 380 may include, inside the portable box, a PLC 305, a power distribution circuitry 165, a set of input terminals 315, a set of input sensors 320, a set of input switches 325, one or more DC output devices 330, one or more AC output devices 335, and/or a set of AC signal distribution relays 390.

The power distribution circuitry 165 of FIGS. 3A-3B may be similar to the power distribution circuitry 165 described above with reference to FIGS. 1A-1B. The PLC 305 may include one or more input ports that may receive DC input signals from the input terminals 315, the input sensors 320, and/or the input switches 325. The input terminals 315 may receive DC signals from other trainers, for example from the DC outputs 187-188 shown in FIGS. 1B and 2B. The PLC trainer 380 may include one or more sensors 320 that may provide DC inputs to the PLC 305. The sensors 320 may be, for example, and without limitations, optical sensors, photoelectric sensors, proximity sensors, laser sensors, etc. The input switches 325 may be manual switches that are set by a person to provide DC inputs to the PLC 305.

The PLC 305 may receive DC inputs, based on the user design, from one or more of the input terminals 315, the input sensors 320, and/or the input switches 325, and may provide the DC output signals 351-354. The PLC 305, depending on how a student may set up the inputs to the PLC 305, may generate several DC output signals 351-354, which may be, for example, and without limitations, 5V DC, 12V DC, 24V DC, etc.

The DC output signals 352 may be connected to a set of output terminals on the portable case of the trainer 380, which may be used to provide the DC outputs to other trainers (e.g., as described below with reference to FIG. 11). The trainer 380 may include several DC output devices 330

(only one is shown for simplicity). The DC signals 351 may control one or more DC output devices 330 that may be included in the trainer 380 to allow the user of the trainer 380 to control the DC output devices 330.

The trainer 380 may include one or more power distribution relays 350 connected to the corresponding AC output devices 335 (only one power distribution relay 350 and one AC output device 335 are shown for simplicity). The power distribution relay(s) 350 may receive AC power 375 from the power distribution relay 150. The PLC 305 may provide a DC input 354 as a control input to each power distribution relay 350. Based on the voltage level (e.g., logical high or logical low) of the DC input 354, the power distribution relay 350 may connect or disconnect the AC voltage 375 to the corresponding AC output device 335 to allow the user of the trainer 380 to control the AC output devices 335.

The trainer 380 may include one or more AC signal distribution relays 390 (only two AC signal distribution relays 391-392 are shown for simplicity). The PLC 305 may provide the DC signals 353 as control signals to the AC signal distribution relays 391-392. Depending on the voltage level of the DC voltages 353 (e.g., logical high or logical low), the corresponding AC signal distribution relay 391-392 may connect or disconnect the AC input 157 to the AC control outputs 385, which may be provided as AC outputs to other trainers (e.g., as described below with reference to FIGS. 7 and 11).

FIG. 4A is a functional block diagram illustrating a training system 400 that includes a PLC trainer that may receive power from other trainers, may provide power to other trainers, may receive control signals from other trainers, and/or may provide control signals to other trainers, according to various aspects of the present disclosure. FIG. 4B is a functional diagram illustrating the interconnections of the PLC trainer of FIG. 4A, according to various aspects of the present disclosure;

With reference to FIG. 4A, the training system 400 may include a monitoring system 190, which may be similar to the monitoring system 190 of FIG. 1A. The training system 400 may include a portable PLC trainer 480. With reference to FIGS. 4A-4B, the portable PLC trainer 480 may be in a portable box that may be similar to the portable box described above with reference to the trainer 180 of FIGS. 1A-1B. The portable PLC trainer 480 may include, inside the portable box, a PLC 305, a set of input terminals 315, a set of input sensors 320, a set of input switches 325, one or more DC output devices 330, one or more AC output devices 335, and/or a set of AC signal distribution relays 390, which may be similar to the corresponding components of FIGS. 3A-3B.

The portable PLC trainer 480 may include a battery-less power distribution circuitry 265, which may be similar to the power distribution circuitry 265 of FIGS. 2A-2B. The trainer 480 provides the technical advantage of being capable of working without a battery and without being connected to the AC outlet. For example, the trainer 480 may receive AC power 168 from another trainer, such as any of the trainers 180, 280, and 380, described above. If one of the trainers 180, 280, or 380 is set to battery mode and provides AC power to the trainer 480, both trainers may be operable without a need to be plugged in an AC outlet.

The DC output devices 330 and the AC output devices 335, described above, are electronics and/or electromechanical devices that the students may control through the PLC 305. This is in contrast with the prior art PLC trainers that only include lights that may be turned on or off by the PLC. The trainers 380 and 480 of the present embodiments provide the technical advantage of allowing the students to control actual electronics and electromechanical devices by the PLC.

Figure 4C:
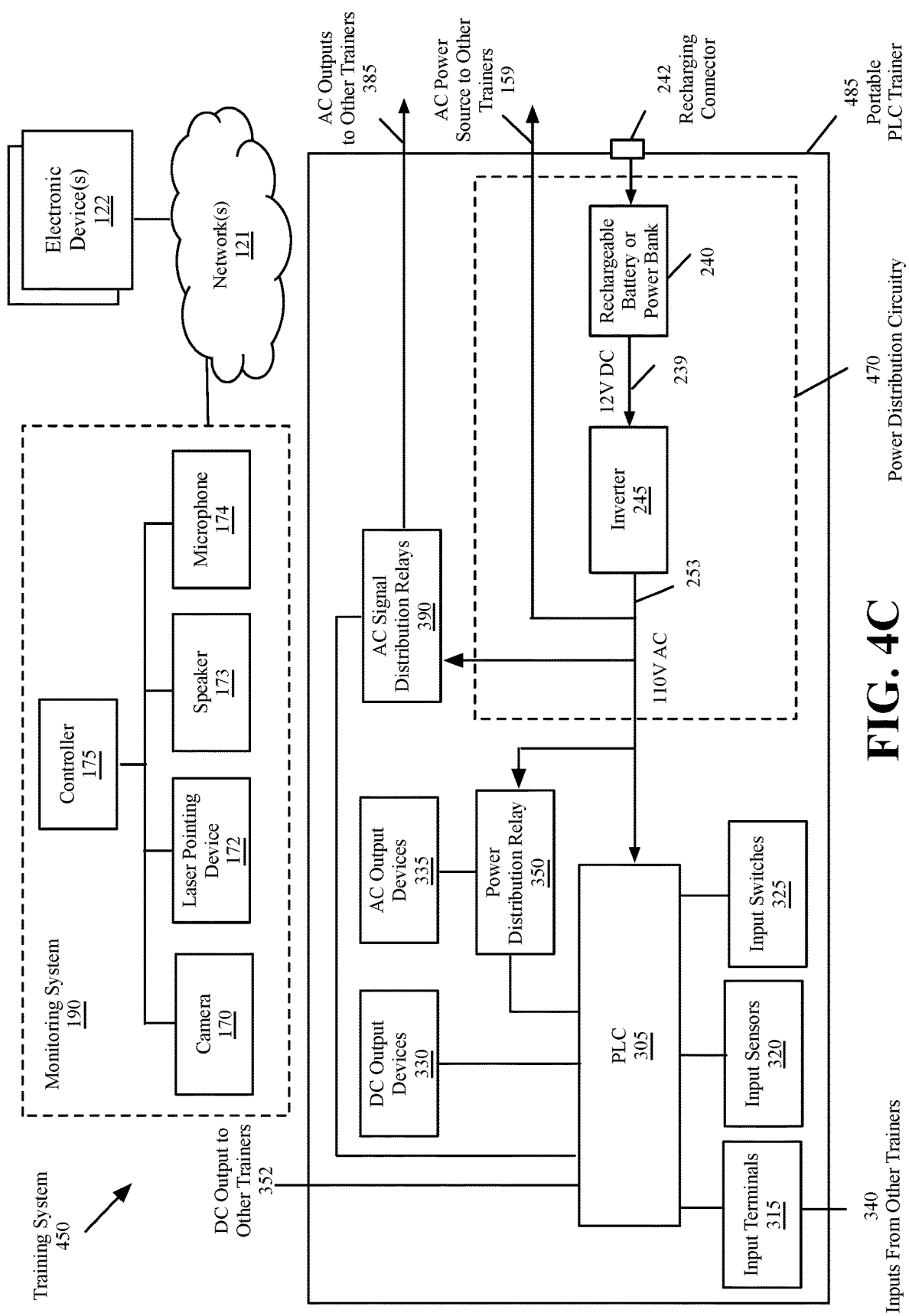
FIG. 4C is a functional block diagram illustrating a training system that includes a PLC trainer that may have a rechargeable battery (or a power bank) as the power source, may provide power to other trainers, and/or may provide control signals to other trainers, according to various aspects of the present disclosure.
Figure 4D:
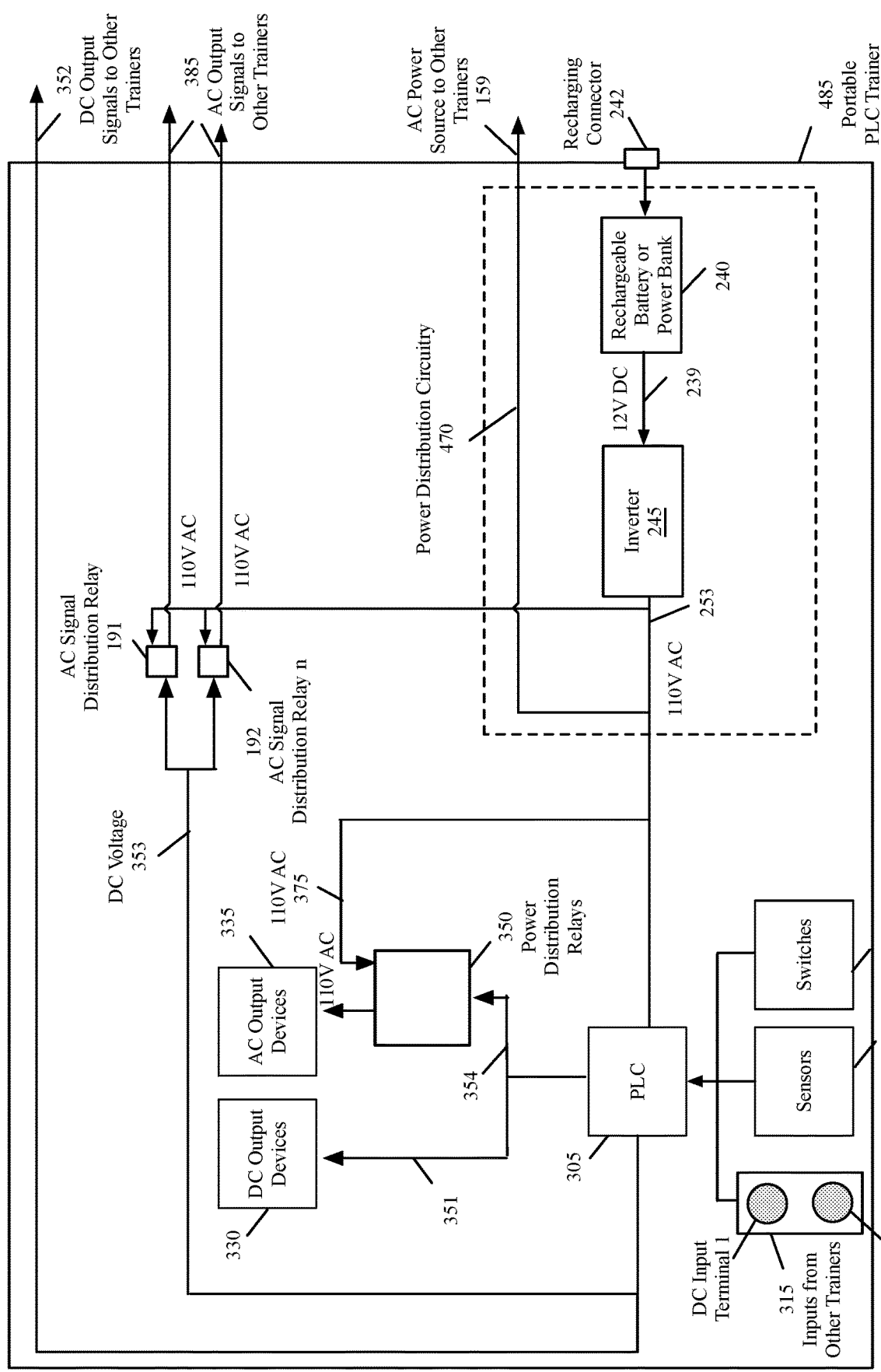
FIG. 4D is a functional diagram illustrating the interconnections of the PLC trainer of FIG. 4C, according to various aspects of the present disclosure.

FIG. 4C is a functional block diagram illustrating a training system 450 that includes a PLC trainer that may have a rechargeable battery (or a power bank) as the power source, may provide power to other trainers, and/or may provide control signals to other trainers, according to various aspects of the present disclosure. FIG. 4D is a functional diagram illustrating the interconnections of the PLC trainer of FIG. 4C, according to various aspects of the present disclosure;

With reference to FIG. 4C, the training system 450 may include a monitoring system 190, which may be similar to the monitoring system 190 of FIG. 1A. The training system 450 may include a portable PLC trainer 485. With reference to FIGS. 4C-4D, the portable PLC trainer 485 may be in a portable box that may be similar to the portable box described above with reference to the trainer 180 of FIGS. 1A-1B. The portable PLC trainer 485 may include, inside the portable box, a PLC 305, a set of input terminals 315, a set of input sensors 320, a set of input switches 325, one or more DC output devices 330, one or more AC output devices 335, and/or a set of AC signal distribution relays 390, which may be similar to the corresponding components of FIGS. 3A-3B.

The portable PLC trainer 485 may include a power distribution circuitry 470. The power distribution circuitry 470 may include a rechargeable battery (or a power bank) 240 and an inverter 245. The inverter 245 may convert the DC input 239 to an AC output 253 and may supply the AC output 253 to the other components of the trainer 485. The AC output 253 of the inverter 245 may be provided as power source 159 to one or more other trainers (e.g., as described below with reference to FIGS. 10A-10B).

The trainer 485 may continue to operate as long as the rechargeable battery, or the power bank, 240 has charge. The rechargeable battery, or the power bank, 240 may be charged through a recharging connector 242, such as, for example, and without limitations, a USB connection. The other components of FIG. 4C, may be similar to the corresponding components of FIG. 3B.

The trainer 485 provides the technical advantage of providing the required working through an internal battery and without being connected to the AC outlet. The trainer 485 may continue to operate as long as the rechargeable battery, or the power bank, 240 has charge. As described below with reference to FIG. 10A-10B, the trainer 485 may provide AC power to other trainers, and all trainers may be operable without a need to be plugged in an AC outlet.

Alternatively, the PLC trainers 380, 480, and/or 485 may not include the DC output device(s) 330, the AC output device(s) 335, and/or the power distribution relay(s) 350 and instead use the DC output signal(s) 352 and/or the AC output signal(s) 385 to control DC output devices and/or AC output devices on other trainers, as described below with reference to FIG. 11. The alternative embodiment provides the technical advantage of reduced weight and/or reduced size, resulting in improved portability.

III. Motors Trainers

The instructional trainers of the present embodiments include motors trainers. Some of the present embodiments provide a training system that includes a portable battery-powered instructional motors trainer and an instructor's monitoring system. FIG. 5A is a functional block diagram illustrating a training system that includes a motors trainer that may that operate on battery power, may receive power from other trainers, may provide power to other trainers, and/or may receive control signals from other trainers, according to various aspects of the present disclosure. FIG. 5B is a functional diagram illustrating the interconnections of the motors trainer of FIG. 5A, according to various aspects of the present disclosure.

With reference to FIG. 5A, the training system 500 may include a monitoring system 190, which may be similar to the monitoring system 190 of FIG. 1A. The training system 500 may include a portable battery-powered motors trainer 580. With reference to FIGS. 5A-5B, the portable motors trainer 580 may be in a portable box that may be similar to the portable box described above with reference to the trainer 180 of FIGS. 1A-1B. The portable motors trainer 580 may include, inside the portable box, a motor 535, a power distribution circuitry 165, one or more input terminals 541-542, a transformer 505, and/or a variable frequency drive (VFD) 530.

The power distribution circuitry 165 of FIGS. 5A-5B may be similar to the power distribution circuitry 165 described above with reference to FIGS. 1A-1B. The motor 535, in this example, may work on three-phase 220 V AC power. The transformer 305 may receive 110 V AC from the output port 154 of the power distribution relay 150 and may output 220 V AC 507 to the VFD 530.

The VFD may convert the single phase 220 V AC to a three-phase 220 V AC voltage 508. The three-phase 220 V AC voltage 508 may drive the motor 535. The VFD 530 may be used to control the motor by changing the input voltage and frequency of the motor. The DC inputs 560 from other trainers connected to the input terminals 541-542 may be applied to the VFD input 509 to control the motor 535 (e.g., depending on the type of the motor, to start and stop the motor, to provide an angle of movement, to change speed, to change torque, etc.).

In the embodiments that the motor is a 220 V AC single-phase motor, the output 507 of the transformer 505 may be connected to the motor 535. These embodiments may not include the VFD 530. In the embodiments that the motor 535 is a 110 V AC single-phase motor, the output port 154 of the power distribution relay 150 may be connected to the motor 535. These embodiments may not include the VFD 530 and the transformer 505.

FIG. 6A is a functional block diagram illustrating a training system that includes a motors trainer that may receive power from other trainers, and/or may provide power to other trainers, may receive control signals from other trainers, according to various aspects of the present disclosure. FIG. 6B is a functional diagram illustrating the interconnections of the motors trainer of FIG. 6A, according to various aspects of the present disclosure.

With reference to FIG. 6A, the training system 600 may include a monitoring system 190, which may be similar to the monitoring system 190 of FIG. 1A. The training system 600 may include a portable instructional motors trainer 680. With reference to FIGS. 6A-6B, the portable motors trainer 680 may be in a portable box that may be similar to the portable box described above with reference to the trainer 180 of FIGS. 1A-1B. The portable motors trainer 680 may include, inside the portable box, a motor 535, one or more input terminals 541-542, a transformer 505, and/or a VFD 530, which may be similar to the corresponding components of FIGS. 5A-5B.

The portable motors trainer 680 may include a battery-less power distribution circuitry 265, which may be similar to the power distribution circuitry 265 of FIGS. 2A-2B. The trainer 680 provides the technical advantage of being capable of working without a battery and without being connected to the AC outlet. As described below with reference to FIG. 10A-10B, the trainer 680 may receive AC power 168 from another trainer, such as, for example, any of the trainers 180, 280, 285, 380, 480, 485, or 580 described above. If one of the trainers 180, 280, 380, 480, or 580 is set to battery mode and provides AC power to the trainer 680, both trainers may be operable without a need to be plugged in an AC outlet.

Figure 6C:
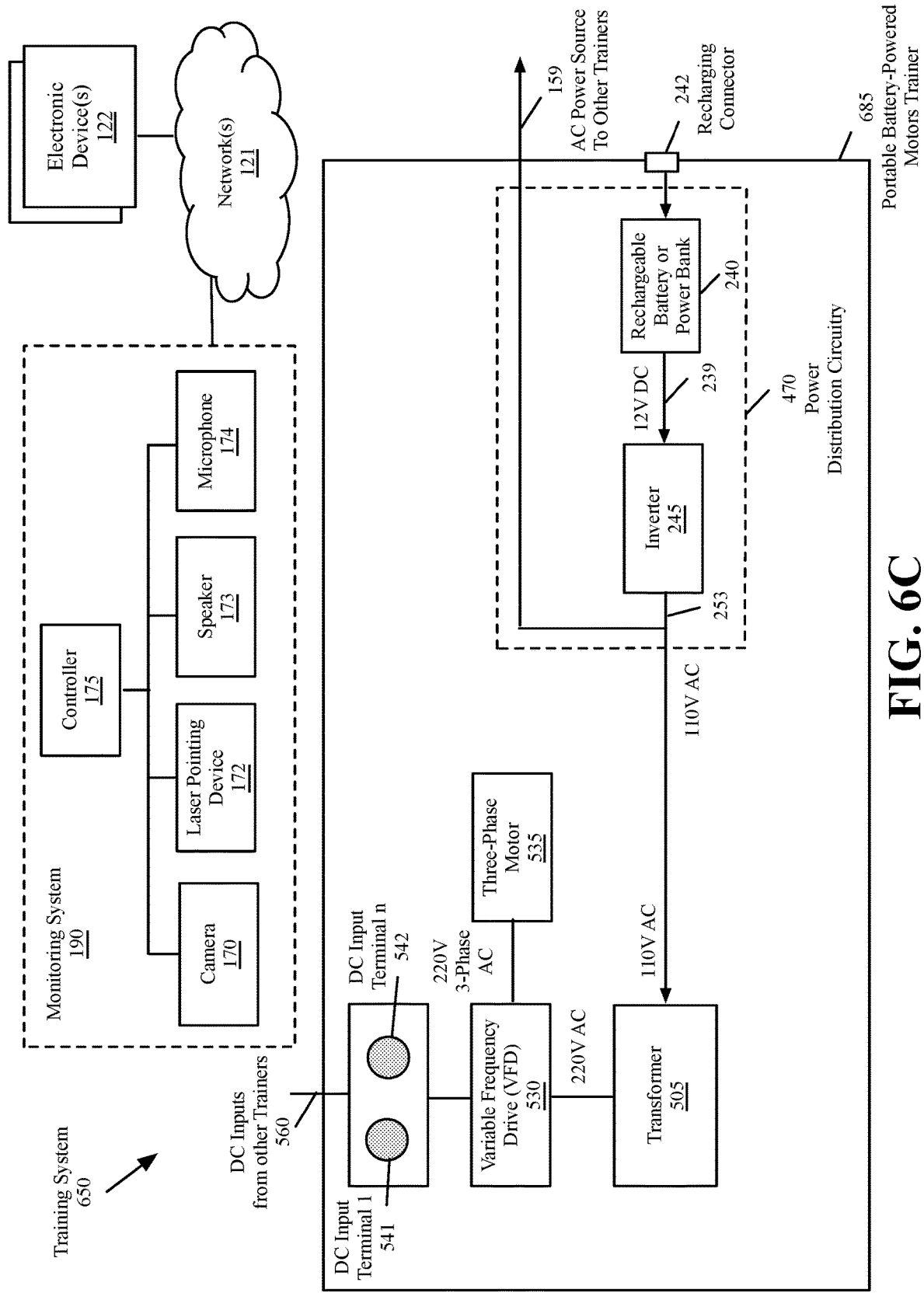
FIG. 6C is a functional block diagram illustrating a training system 650 that includes a motors trainer that may have a rechargeable battery (or a power bank) as the power source, may provide power to other trainers, and/or may provide control signals to other trainers, according to various aspects of the present disclosure.
Figure 6D:
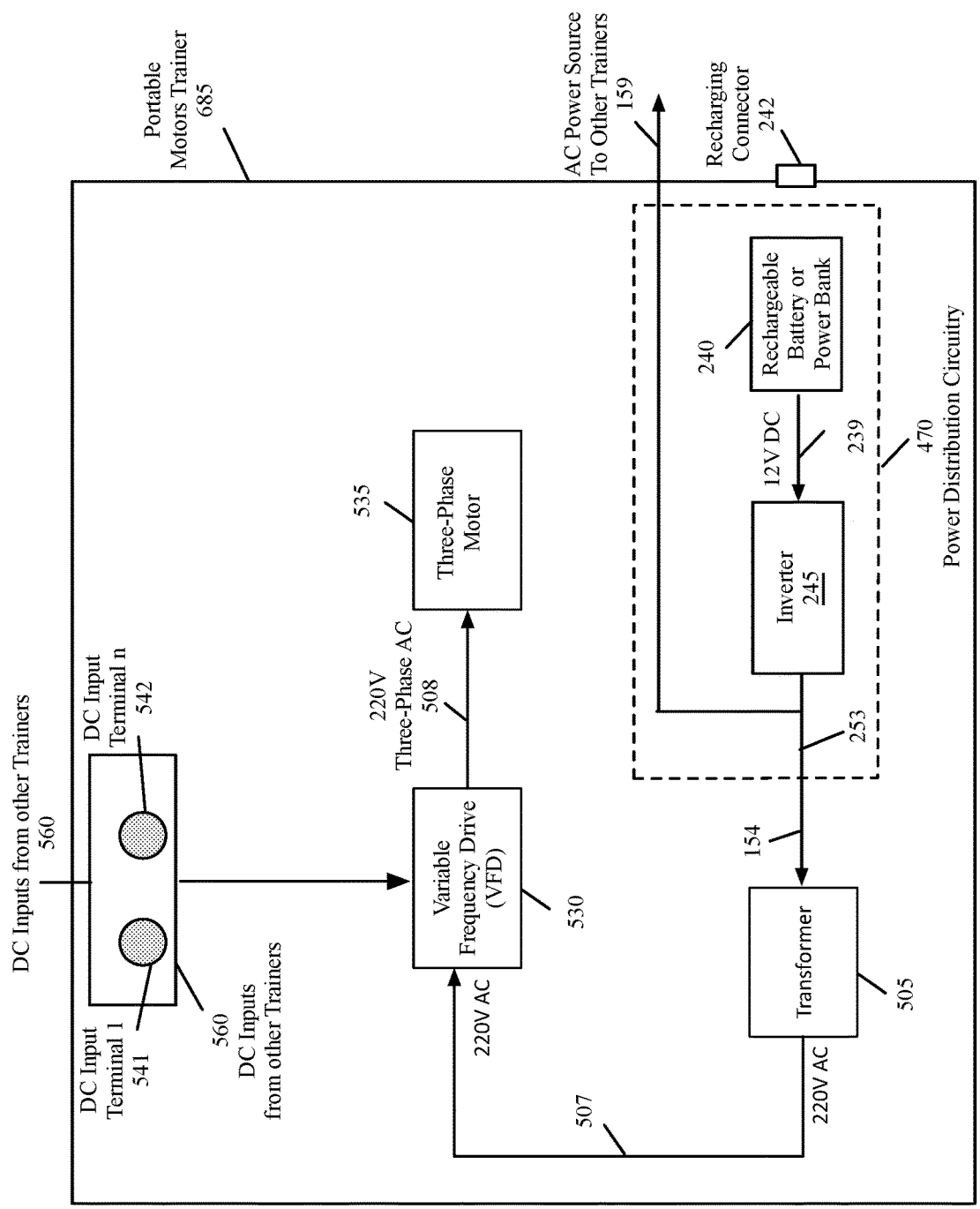
FIG. 6D is a functional diagram illustrating the interconnections of the motors trainer of FIG. 6C, according to various aspects of the present disclosure.

FIG. 6C is a functional block diagram illustrating a training system 650 that includes a motors trainer that may have a rechargeable battery (or a power bank) as the power source, may provide power to other trainers, and/or may provide control signals to other trainers, according to various aspects of the present disclosure. FIG. 6D is a functional diagram illustrating the interconnections of the motors trainer of FIG. 6C, according to various aspects of the present disclosure.

With reference to FIG. 6C, the training system 650 may include a monitoring system 190, which may be similar to the monitoring system 190 of FIG. 1A. The training system 650 may include a portable motors trainer 685. With reference to FIGS. 4C-4D, the portable motors trainer 685 may be in a portable box that may be similar to the portable box described above with reference to the trainer 180 of FIGS. 1A-1B. The portable motors trainer 685 may include, inside the portable box, a motor 535, one or more input terminals 541-542, a transformer 505, and/or a VFD 530, which may be similar to the corresponding components of FIGS. 5A-5B.

The portable PLC trainer 685 may include a power distribution circuitry 470. The power distribution circuitry 470 may include a rechargeable battery (or a power bank) 240 and an inverter 245. The inverter 245 may convert the DC input 239 to an AC output 253 and may supply the AC output 253 to the other components of the trainer 685. The AC output 253 of the inverter 245 may be provided as power source 159 to one or more other trainers (e.g., as described below with reference to FIGS. 10A-10B).

The trainer 685 may continue to operate as long as the rechargeable battery, or the power bank, 240 has charge. The rechargeable battery, or the power bank, 240 may be charged through a recharging connector 242, such as, for example, and without limitations, a USB connection. The other components of FIG. 6C, may be similar to the corresponding components of FIG. 5B.

The trainer 685 provides the technical advantage of providing the required working through an internal battery and without being connected to the AC outlet. The trainer 685 may continue to operate as long as the rechargeable battery, or the power bank, 240 has charge. As described below with reference to FIG. 10A-10B, the trainer 685 may provide AC power to other trainers, and all trainers may be operable without a need to be plugged in an AC outlet.

Figure 7:
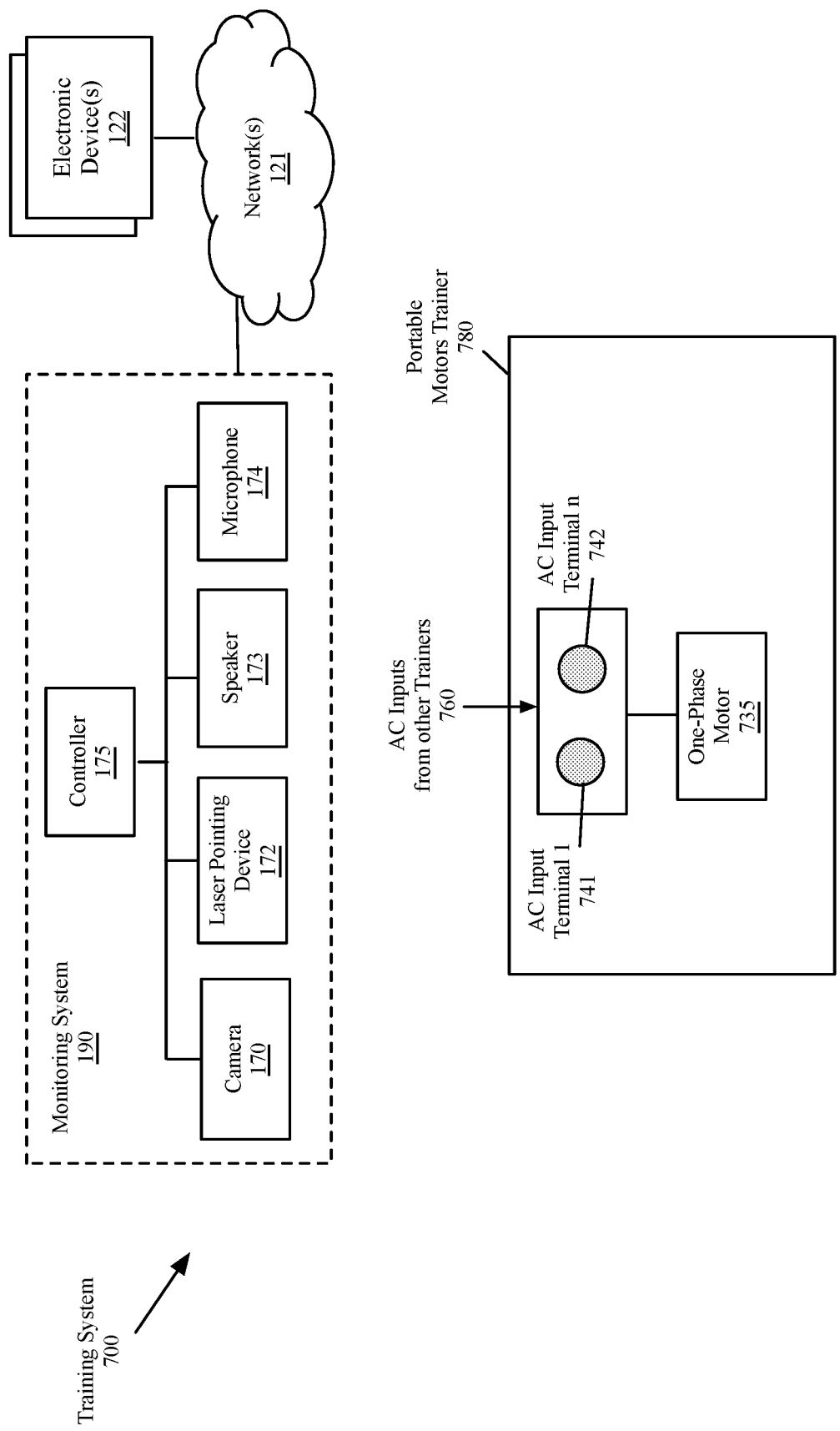
FIG. 7 is a functional block diagram illustrating a training system that includes a motors trainer that may receive power from other trainers, according to various aspects of the present disclosure.

FIG. 7 is a functional block diagram illustrating a training system that includes a motors trainer that may receive power from other trainers, according to various aspects of the present disclosure. With reference to FIG. 7, the training system 700 may include a monitoring system 190, which may be similar to the monitoring system 190 of FIG. 1A. The training system 700 may include a portable instructional motors trainer 780. With reference to FIG. 7, the portable motors trainer 780 may be in a portable box that may be similar to the portable box described above with reference to the trainer 180 of FIGS. 1A-1B. The portable motors trainer 780 may include, inside the portable box, a motor 735 and one or more AC input terminals 741-742.

The motor 735, in this example, may be a one-phase motor that may operate on 110 V AC power. As shown, the AC inputs 760 from other trainers may be connected to the AC input terminals 741-742. The AC input terminals 741-742 may be connected to the one-phase motor 735 to provide power. For example, the AC inputs 760 may be connected to the AC output signals 197-197 of the trainers 180, 280, and 285, the AC output signals 385 of the trainers 380, 480, and 485 in order to allow a person to design a circuit on the trainers 180, 280, 285, 380, 480, or 485 to generate the AC signals to provide power to the motor 735, for example, to selectively turn the motor 735 on or off The motors trainers of prior art include a controller, such as a PLC, to control the motor. The motors trainer 780 of the present embodiments provides the technical advantage of not requiring a controller and may be controlled through a user designed circuit from another trainer. By not including the motor and the controller circuitry in separate trainers, the weight of both trainers are reduced and make them easy to be carried as portable trainers.

IV. Pneumatics Trainers

The instructional trainers of the present embodiments include pneumatics trainers. Some embodiments may provide an instructional pneumatics trainer used by students for designing systems to control pneumatic devices, such as, for example, and without limitations, pumps, valves, pneumatic indicators, pneumatic counters, cylinders, air motors, pneumatic actuators, etc., that may operate based on fluid pressure. FIG. 8A is a functional block diagram illustrating a training system that includes a pneumatics trainer that that may operate on battery power, may receive power from other trainers, may provide power to other trainers, and/or may receive control signals from other trainers, according to various aspects of the present disclosure. FIG. 8B is a functional diagram illustrating the interconnections of the pneumatics trainer of FIG. 8A, according to various aspects of the present disclosure.

With reference to FIG. 8A, the training system 800 may include a monitoring system 190, which may be similar to the monitoring system 190 of FIG. 1A. The training system 800 may include a portable pneumatics trainer 880. With reference to FIGS. 8A-8B, the portable pneumatics trainer 880 may be in a portable box that may be similar to the portable box described above with reference to the trainer 180 of FIGS. 1A-1B. The portable pneumatics trainer 880 may include, inside the portable box, a pump 805, one or more valves 881-882 and/or one or more other pneumatic devices 883-884, one or more solenoids 871-874, a PLC 810, a power distribution circuitry 165, one or more input terminals 820, one or more input switches 825, and/or one or more input sensors 830.

The power distribution circuitry 165 of FIGS. 8A-8B may be similar to the power distribution circuitry 165 described above with reference to FIGS. 1A-1B. The pump 805 may receive AC power from the power distribution relay 150 and may pump a fluid (e.g., and without limitations, air) into the fluid pipes 840. The fluid flow into the valves 881-882 and/or the other pneumatic devices 883-884 may be controlled by the corresponding solenoids 871-874. The solenoids 871-874 may be valves that operate as on/off switches for allowing or preventing the fluid to pass through. The solenoids 871-874 may receive DC control signals 811 from the PLC 810. The PLC 810 may include one or more input ports. Based on the user design, the PLC 810 may receive DC inputs, from one or more of the input terminals 820, the input sensors 830, and/or the input switches 825, and may provide the DC signals 811 to the solenoids 871-874.

The pneumatics trainers, in some embodiments, may not include a PLC or other type of controllers and may instead receive control signals from one or more other interconnected trainers. FIG. 9A is a functional block diagram illustrating a trainer system that includes a pneumatics trainer that may receive power from other trainers, may provide power to other trainers, and/or may receive control signals from other trainers, according to various aspects of the present disclosure. FIG. 9B is a functional diagram illustrating the interconnections of the pneumatics trainer of FIG. 9A, according to various aspects of the present disclosure.

With reference to FIG. 9A, the training system 900 may include a monitoring system 190, which may be similar to the monitoring system 190 of FIG. 1A. The training system 900 may include a portable pneumatics trainer 980. With reference to FIGS. 9A-9B, the portable pneumatics trainer 980 may be in a portable box that may be similar to the portable box described above with reference to the trainer 180 of FIGS. 1A-1B. The portable pneumatics trainer 980 may include, inside the portable box, a pump 805, one or more valves 881-882 and/or one or more other pneumatic devices 883-884, one or more solenoids 871-874, and/or one or more input terminals 820. The portable pneumatics trainer 980 may include a battery-less power distribution circuitry 265, which may be similar to the power distribution circuitry 265 of FIGS. 2A-2B.

In contrast to the pneumatics trainer 880 of FIGS. 8A-8B, the pneumatics trainer 980 of FIGS. 9A-9B do not include a PLC to control the solenoids 871-874, the valves 881-882, and/or the other pneumatics devices 883-884. Instead, the trainer 980 may receive the DC inputs 840 from other trainers at the input terminals 820 to control the solenoids 871-874.

The trainer 980 provides the technical advantage of reducing the weight, complexity, and/or size by eliminating the PLC and other control circuitry to control the valves and other pneumatic devices. In addition, the trainer 980 provides the technical advantage of being capable of operating without a battery and without being connected to an AC outlet. As described below with reference to FIG. 10A-10B, the trainer 980 may receive AC power 168 from another trainer, such as any of the trainers 180, 280, 380, 480, or 580 described above. If one of the trainers 180, 280, 380, 480, or 580 is set to battery mode and provides AC power to the trainer 980, both trainers may be operable without a need to be plugged in an AC outlet.

Figure 2D:
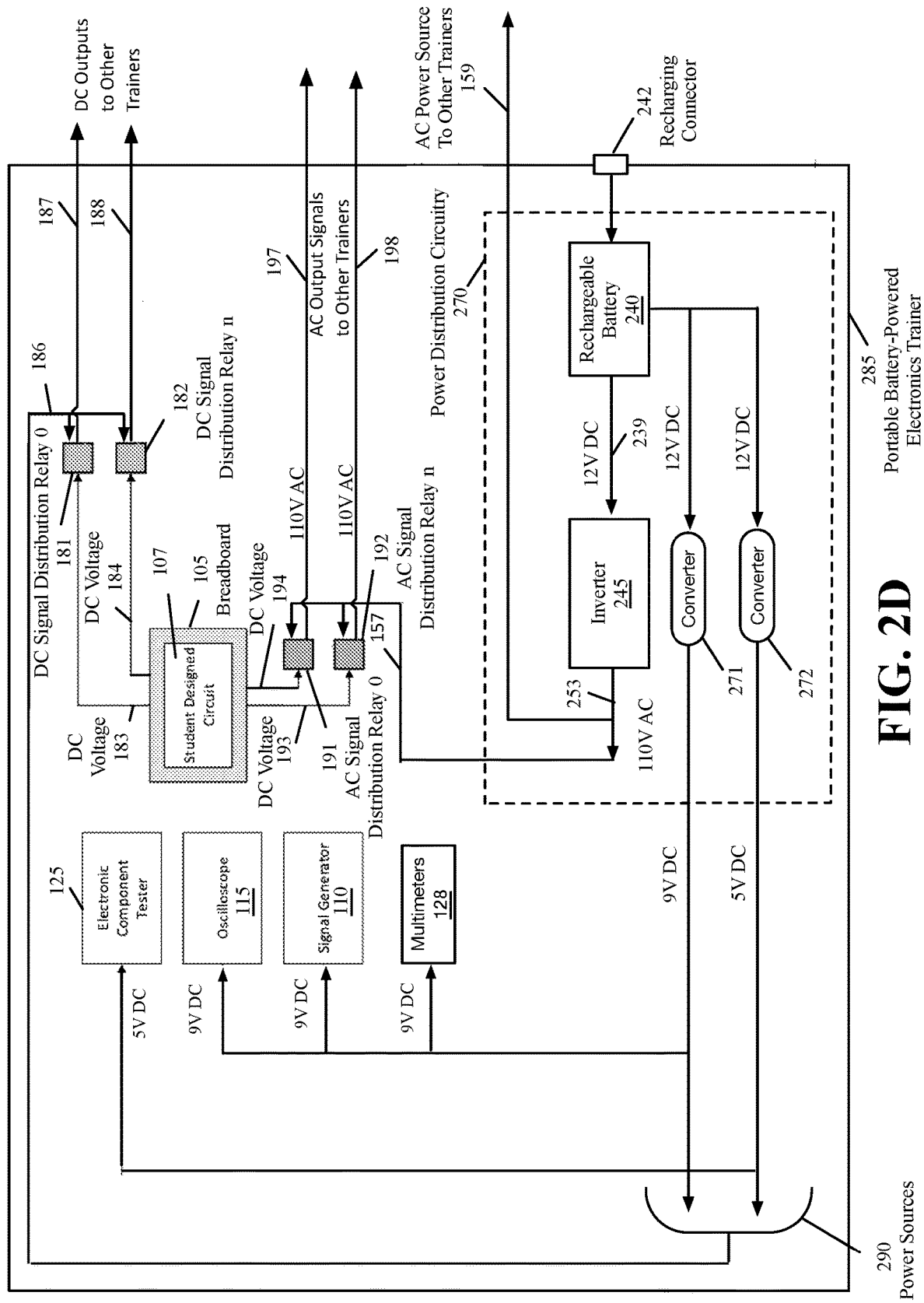
FIG. 2D is a functional diagram illustrating the interconnections of the electronics trainer of FIG. 2C, according to various aspects of the present disclosure.

The pneumatics trainers of the present embodiments may include a power distribution circuitry that is similar to the power distribution circuitry 165 of FIGS. 8A-8B, a battery-less power distribution circuitry similar to the power distribution circuitry 265 of FIGS. 9A-9B, or a power distribution circuitry such as the power distribution circuitry 270 of FIGS. 2C-2D that has a rechargeable battery (or a power bank) as the power source.

The pneumatics trainers with the battery-less power distribution circuitry 265 provide the technical advantage of being capable of working without a battery and without being connected to the AC outlet. As described below with reference to FIG. 10A-10B, these trainers may receive AC power 168 from another trainer, such as the trainer 180 of FIGS. 1A-1B. If the trainer 180 is set to battery mode and provides AC power to the pneumatics trainer, both trainers may be operable without a need to be plugged in an AC outlet.

The pneumatics trainers with a power distribution circuitry similar to the power distribution circuitry 270 of FIG.

2C provide the technical advantage of providing the required working through an internal battery, or a power bank, and without being connected to the AC outlet. These trainers may continue to operate as long as the rechargeable battery, or the power bank, 240 has charge. These trainers may provide AC power to other trainers, similar to the AC power output 159 of FIG. 2C. As described below with reference to FIG. 10A-10B, these trainers may provide AC power to other trainers, and all trainers may be operable without a need to be plugged in an AC outlet.

V. Interconnecting Trainers to Share Power and/or Exchange Control Signals

The prior art trainers require elaborate lab setup to provide AC outlets and bench space. Setting up lab space is often expensive, requires the students to physically work in the lab area, and limits the number of students that may use the lab space for using the trainers. The requirement of the prior art trainers to be connected to an AC outlet may force the instructors to walk to the students' stations to see the results of the projects. In addition, the prior art trainers pack all equipment required to teach students the operation of a particular device in one trainer, making the trainer bulky, heavy, and difficult to move around during the setup. For example, in order to train the students the operation of a motor, the prior art trainers may have to also include a PLC in the trainer to control the motor.

A technical advantage of the trainers of the present embodiments is the capability of connecting multiple trainers together to share power and/or exchange control signals, resulting in reduction in weight and increase in portability of the individual trainers. As an example, a motor trainer (such as the motors trainer 580 of FIGS. 5A-5B, the motors trainer 680 of FIGS. 6A-6B, the motors trainer 685 of FIGS. 6C-6D, or the motor trainer 780 of FIG. 7) or a pneumatics trainer (such as the pneumatics trainer 980 of FIGS. 9A-9B) may not include a PLC or other controllers to control the motor or the pneumatic devices. Instead the control signals may be received from a trainer (such as the electronics trainer 180 of FIGS. 1A-1B, the electronics trainer 280 of FIGS. 2A-2B, the electronics trainer 285 of FIGS. 2C-2D, the PLC trainer 380 of FIGS. 3A-3B, the PLC trainer 480 of FIGS. 4A-4B, the PLC trainer 485 of FIGS. 4C-4D) through the DC output signals or the AC output signals generated by the electronics or PLC trainers.

As a result, the weight and the size of the motors or pneumatics trainers may be reduced by not including the controller devices in these trainers. The weight and the size of the electronics trainers or the PLC trainers may also be reduced by including some of the devices that the students may want to control by these trainers in other trainers.

The inclusion of the DC signal distribution relays, the AC signal distribution relays, the DC input terminals, and/or the AC input terminals, described above, in the instructional trainers of the present embodiments provides the technical advantage of making a modular system of trainers where each trainer may generate and/or may receive some or all of the control signals that are needed to operate the trainer from one or more other trainers. The AC or DC signal distribution relays may be activated based on a circuit that the students design, which may be in the same trainer or in another interconnected trainer. In some trainers, such as the motor trainer 780 of FIG. 7, the trainer may be controlled by receiving the AC power from another trainer.

As another example, the trainers described above may be connected to other trainers to provide power to and/or to receive power from the other trainers. For example, one trainer may provide power to several other trainers, or a first trainer may provide power to a second trainer, which in turn may provide power to a third trainer, etc. A trainer that provides power to other trainers may itself operate on battery, resulting on the interconnected trainers to operate without any access to an AC outlet.

Some trainers, such as the trainer described above with reference to FIGS. 2A-2B, 4A-4B, 6A-6B, and 9A-9B may not include the battery charger 135, the battery 140, the inverter 145, and the power distribution relay 150 and still receive power from another trainer. The trainers of FIGS. 2A-2B, 4A-4B, 6A-6B, and 9A-9B may be smaller and have less weight than the trainers that include the battery charger 135, the battery 140, the inverter 145, and the power distribution relay 150. As another example, the battery-operated trainers may be set to battery mode, unplugged from an outlet or other trainers, and may be taken by the students to the instructors to see the results of the students designs.

Some trainers, such as the trainer described above with reference to FIGS. 2C-2D, 4C-4D, 6C-6D, and some of the pneumatics trainers (as described above) may include a power distribution circuitry 270 that provide the technical advantage of providing the required working through an internal battery, or a power bank, and without being connected to the AC outlet. These trainers may continue to operate as long as the rechargeable battery, or the power bank, has charge. These trainers may provide AC power to other trainers, and all trainers may be operable without a need to be plugged in an AC outlet.

Figure 10A:
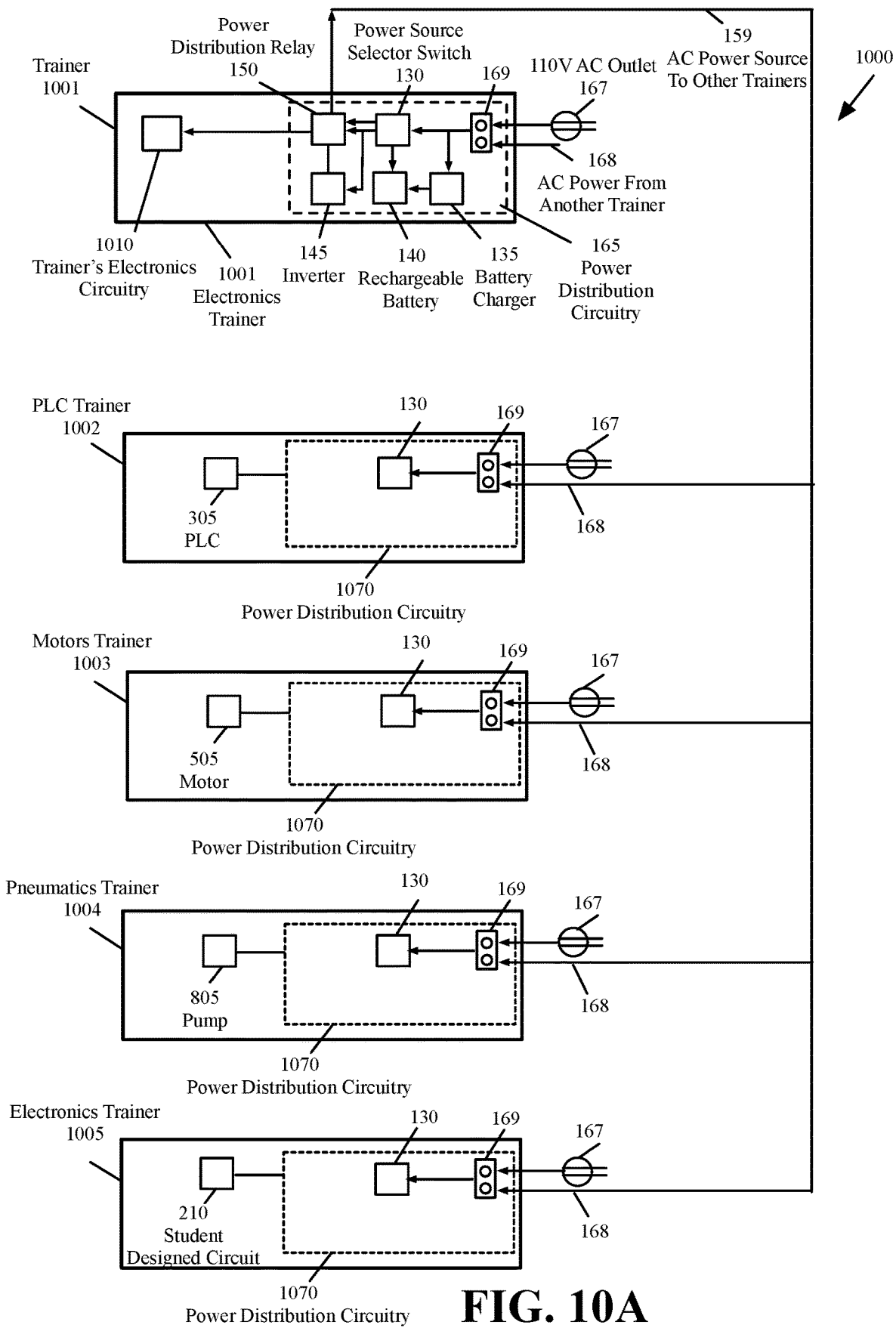
FIG. 10A is a functional diagram illustrating a system, where one trainer provides power to one or more other trainers, according to various aspects of the present disclosure.

FIG. 10A is a functional diagram illustrating a system 1000, where one trainer provides power to one or more other trainers, according to various aspects of the present disclosure. With reference to FIG. 10A, the trainer 1001 may be any of the battery-operated trainers described above with reference to FIGS. 1A-1B, 2C-2D, 3A-3B, 4C-4D, 5A-5B, 6C-6D, 8A-8B, and 9A-9B. For example, the trainer's electronic circuitry 1020 may include a breadboard, a PLC, a motor, a pump, etc., as described above with reference to FIGS. 1A-1B, 2C-2D, 3A-3B, 4C-4D, 5A-5B, 6C-6D, and 8A-8B. The trainer 1001 may include (as shown) a power distribution circuitry 165 similar to the power distribution circuitry 165 described above with reference to FIGS. 1A-1B, 3A-3B, 5A-5B, and 8A-8B. The trainer 1001 may include (not shown) a power distribution circuitry 270 similar to the power distribution circuitry 270 described above with reference to FIGS. 2C-2D, 3A-3B, 4C-4D, 5A-5B, 6C-6D, 8A-8B, and 9A-9B.

When the trainer 1001 in the example of FIG. 10A includes the power distribution circuitry 165, the trainer 1001 may either operate from an external power source (e.g., from the AC outlet 167) or may operate from the internal battery 135. When the trainer 1001 in the example of FIG. 10A includes the power distribution circuitry 270, the trainer 1001 may operate from the internal battery 135.

The trainer 1001 may provide AC power to one or more other trainers 1002-1005 through the AC power source to the other trainer line 159. The trainer 1001 may provide power to any number of one or more other trainers as long as the power distribution circuitry of the trainer 1001 may provide the required power (voltage, amperage, wattage, etc.) that is required for the operation of the trainer 1001 and the operation of any other trainers that receive power from the trainer 1001.

The trainers 1002-1005 may be any of the trainers described above with reference to FIGS. 1A-1B, 2A-2B, 3A-3B, 4A-4B, 5A-5B, 6A-6B, 8A-8B, and/or 9A-9B. The power distribution circuitry 1070 of the trainers 1002-1005 may be similar to the power circuitry 165, the power circuitry 265, the power circuitry 270, or the power circuitry 470 described above with reference to FIGS. 1B, 2B, 2D, and 6D, respectively.

The system 1000 provides the technical advantage of eliminating the requirement for an AC outlet (if the trainer 1001 is on battery mode) or reducing the requirement for the AC outlets to one (if the trainer 1001 is receiving power from the AC outlet 167). The system 1000 may be used without the need for elaborate lab setup and wiring. Furthermore, although FIG. 10A shows all trainers 1002-1005 are receiving their powers from the trainer 1001, some of the trainers 1002-1005 may provide power to other trainers. For example, the trainer 1002 may receive power from the trainer 1001 and may provide power, through a corresponding power output 159 (not shown) AC power source to one or more other trainers, which in turn may provide power to one or more other trainers. The trainers 1001-1005 may have reduced size and weight compared to the prior art trainers and one or more of them may be easily shipped to the students at home as a part of a distance education program.

Figure 10B:
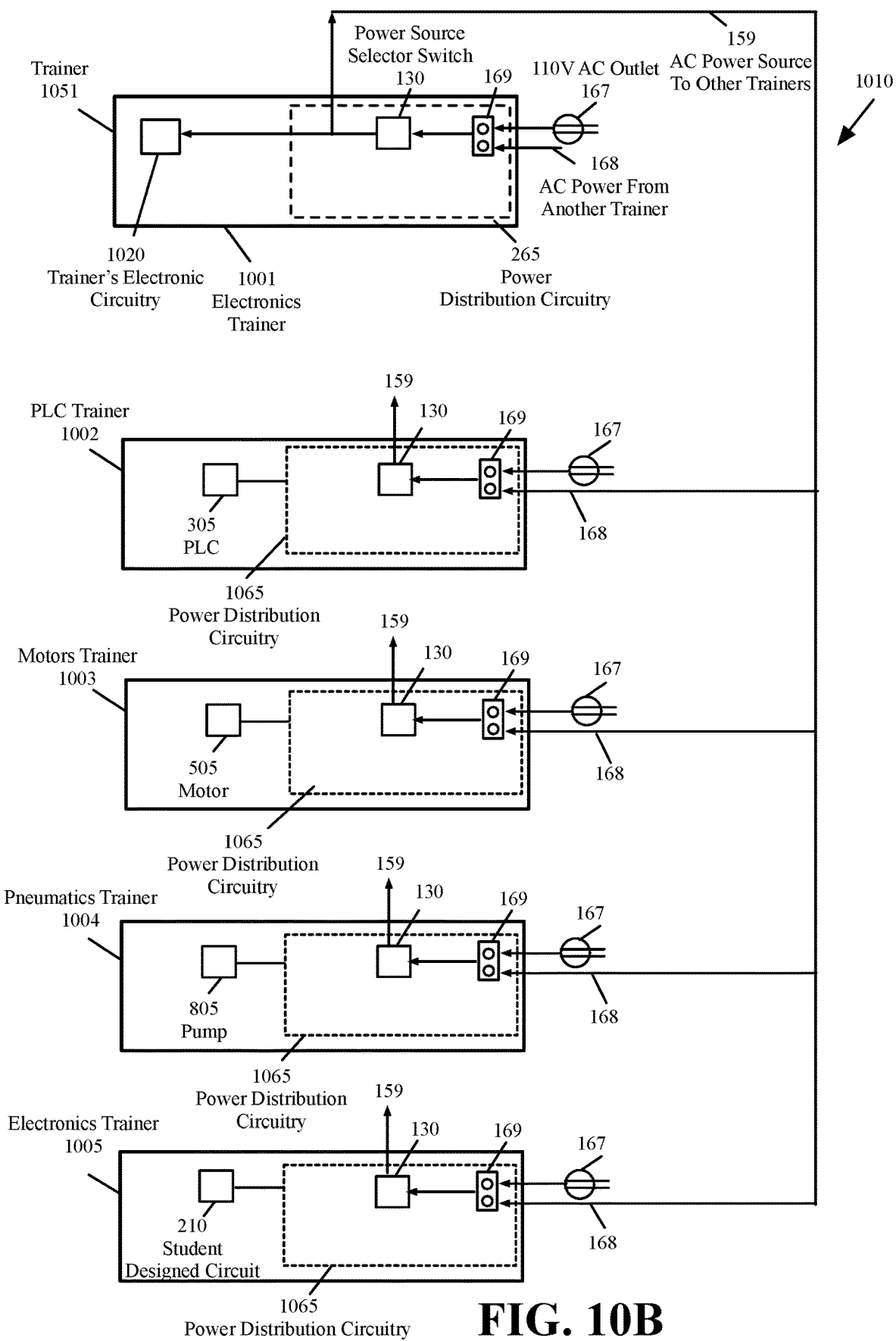
FIG. 10B is a functional diagram illustrating a system, where one trainer that is connected to AC power provides power to one or more other trainers, according to various aspects of the present disclosure.

FIG. 10B is a functional diagram illustrating a system 1010, where one trainer that is connected to AC power provides power to one or more other trainers, according to various aspects of the present disclosure. With reference to FIG. 10B the trainer 1051 may be any of the trainers described above with reference to FIGS. 2A-2B, 4A-4B, 6A-6B, and 9A-9B. The trainer 1051 may include a power distribution circuitry 265 similar to the power distribution circuitry 265 described above with reference to 2A-2B, 4A-4B, 6A-6B, and 9A-9B.

The trainer 1051 in the example of FIG. 10B may operate from an external power (e.g., from the AC outlet 167). The trainer 1051 may provide AC power to one or more other trainers 1002-1005 through the AC power source to the other trainer line 159. Other details of the system 1010 is similar to the system 1000 of FIG. 10A.

The system 1010 provides the technical advantage of operating several trainers from one AC outlet, and eliminating the requirement for an AC outlet for each individual trainer. The system 1010 may be used without the need for elaborate lab setup and wiring. Furthermore, although FIG. 10B shows all trainers 1002-1005 are receiving their powers from the trainer 1051, some of the trainers 1002-1005 may provide power to other trainers. For example, the trainer 1002 may receive power from the trainer 1051 and may provide power, through the corresponding power output 169 AC power source to one or more other trainers, which in turn may provide power to one or more other trainers.

Figure 11:
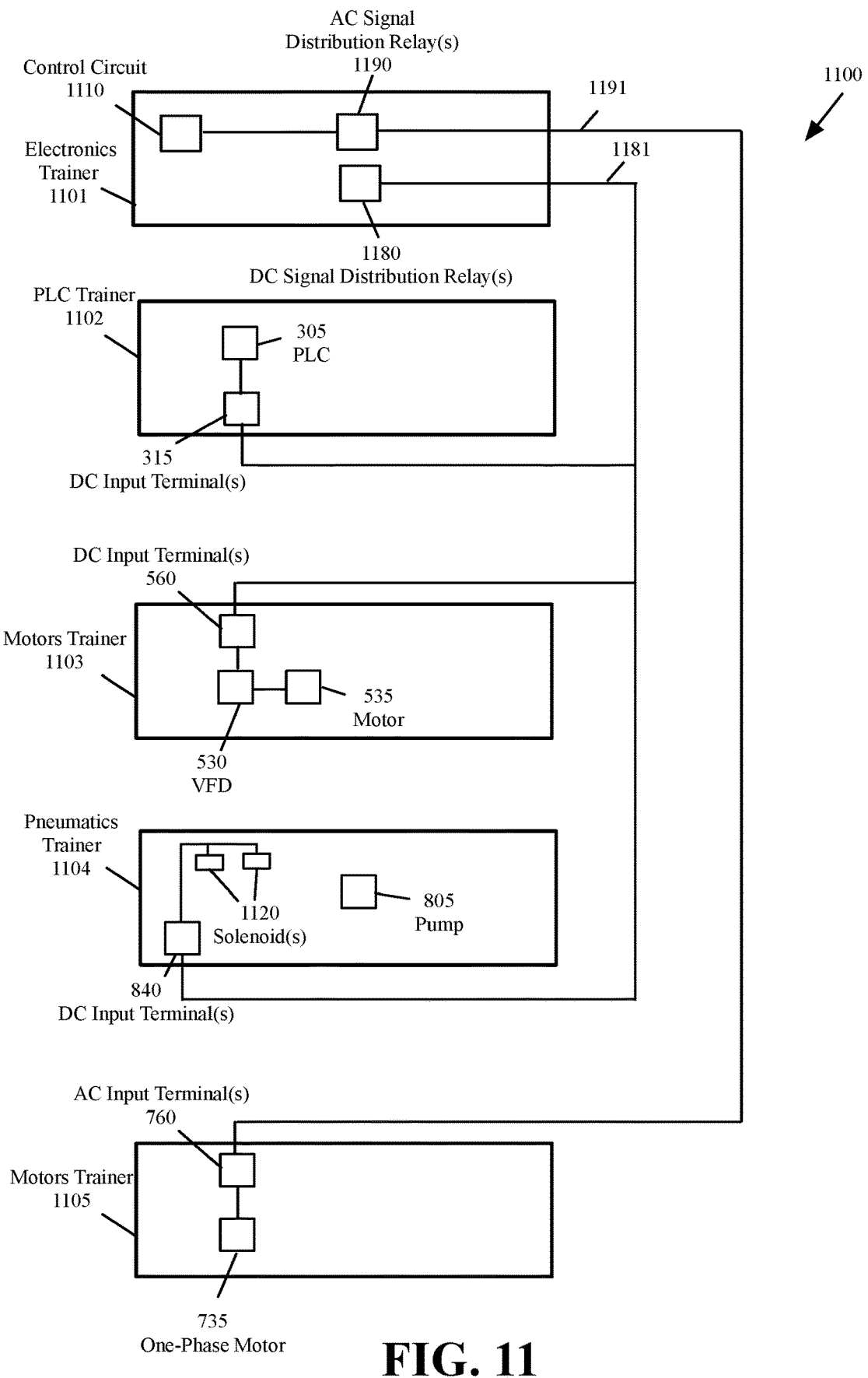
FIG. 11 is a functional diagram illustrating a system, where one trainer provides AC and/or DC control signals to one or more other trainers, according to various aspects of the present disclosure.

FIG. 11 is a functional diagram illustrating a system 1100, where one trainer provides AC and/or DC control signals to one or more other trainers, according to various aspects of the present disclosure. With reference to FIG. 11, the trainer 1101 may be a trainer with one or more DC signal distribution relays 1180 and/or one or more AC signal distribution relays 1090. For example, the trainer 1101 may be an electronics trainer such as the electronics trainer 180 of FIGS. 1A-1B, the electronics trainer 280 of FIGS. 2A-2B, the electronics trainer 285 of FIGS. 2C-2D, the PLC trainer 380 of FIGS. 3A-3B, the PLC trainer 480 of FIGS. 4A-4B, and/or the PLC trainer 485 of FIGS. 4C-4D.

The control circuit 1110 of the trainer 1101 may be a student designed circuit 107 (FIGS. 1B, 2B, 2D) or a PLC 305 (FIGS. 3B, 4B, 4D) that may provide control signals to the DC signal distribution relay(s) 1180 and/or to the AC signal distribution relay(s) 1090, causing the DC signal distribution relay(s) 1180 and/or the AC signal distribution relay(s) 1090 to, respectively, provide DC or AC signals on the output lines 1181 and 1191.

The trainers 1102-1105 may be any of the trainers described above that may receive DC and/or AC control signals from other trainers. For example, the trainer 1102 may be a PLC trainer such as the PLC trainers 380, 480, or 485, described above. The trainer 1103 may be a motors trainer such as the motors trainers 580, 680, or 685, described above. The trainer 1104 may be a pneumatics trainer such as the pneumatics trainers 880 or 980 and the solenoid 1120 may be similar to the solenoids 871-874, described above. The trainer 1105 may be a motors trainer such as the motors trainer 780, described above.

Although, FIG. 11 shows that only the trainer 1101 is providing AC and DC control signals to the other trainers 1102-1105, it should be understood that any number of, in some embodiments, trainers may be connected to each other to send and/or receive DC and/or AC signals from each other. In addition to providing AC and/or DC control signals from one or more trainers to the other trainers in FIG. 11, one or more trainers of FIG. 11 may provide power to the other trainers (e.g., as described above with reference to FIGS. 10A and 10B). In the words, some of the trainers of FIG. 11 may provide AC and/or DC control signals to the other trainers while some trainers may provide power to the others. The trainer(s) that provide(s) power may be the same or different than the trainer(s) that provide(s) AC and/or DC control signals.

In addition to providing power from one or more trainers to the other trainers in FIG. 10A or FIG. 10B, one or more trainers of FIG. 10A or FIG. 10B may provide AC and/or DC control signals to the other trainers (e.g., as described above with reference to FIG. 11). In the words, some of the trainers of FIG. 10A or FIG. 10B may provide power to the other trainers while some trainers may provide AC and/or DC control signals to the others. The trainer(s) that provide(s) AC and/or DC control signals may be the same or different than the trainer(s) that provide(s) power.

The modular system 1100 of FIG. 11 provides the technical advantage of reducing the weight and the size of the individual trainers, as some trainers may include the control circuitry while the other trainers may only include the devices that are to be controlled by the student designed circuits.

VI. Electric Wiring Trainer

Figure 12:
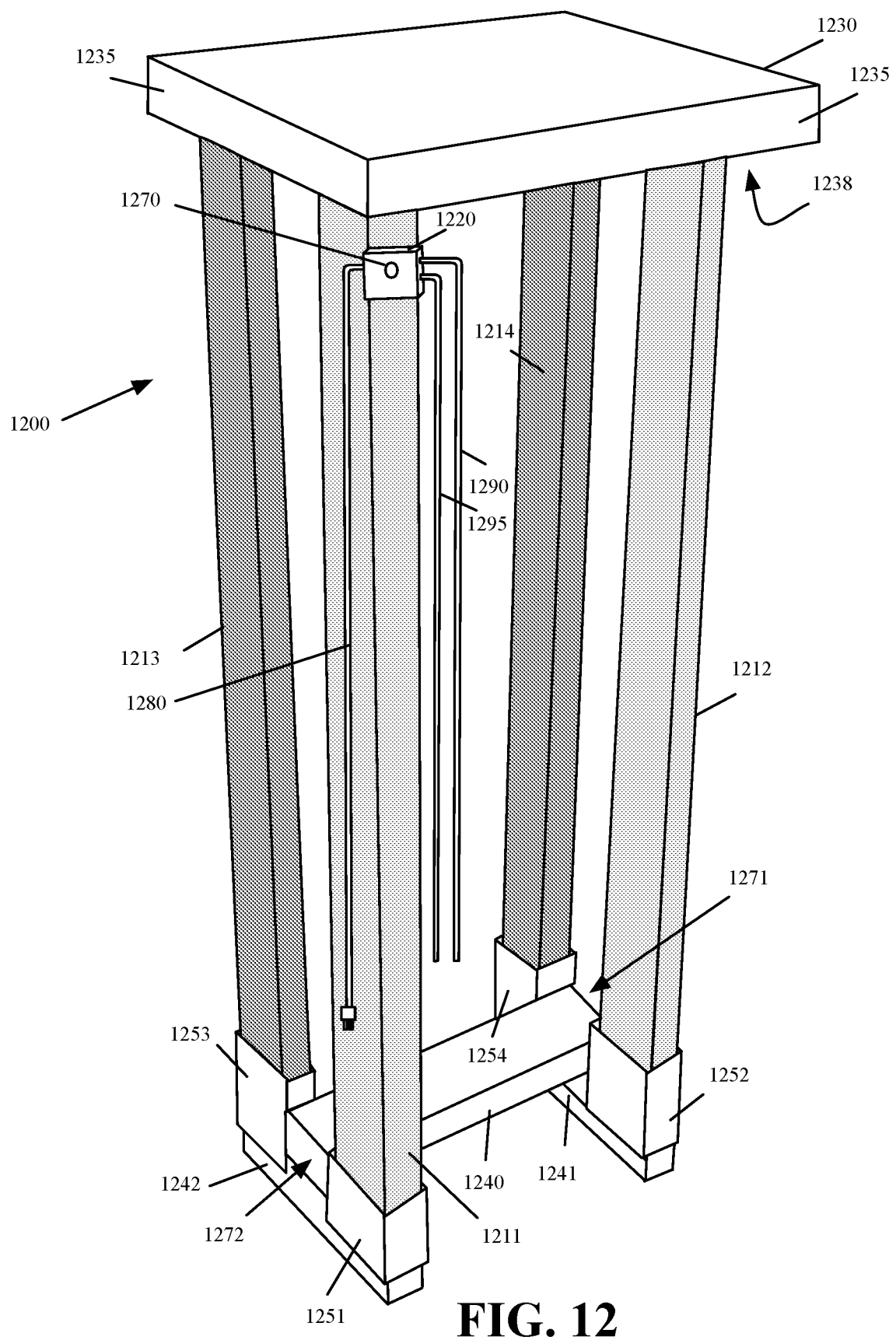
FIG. 12 illustrates a perspective view of a portable wiring trainer, according to various aspects of the present disclosure.

Some embodiments provide a wiring trainer to practice installing electrical devices and wiring for both residential buildings and commercial buildings. FIG. 12 illustrates a perspective view of a portable wiring trainer, according to various aspects of the present disclosure. With reference to FIG. 12, the portable wiring trainer 1200 may include a plurality of wood poles (or beams) 1211-1212, a plurality of metal poles (or beans) 1213-1214, a power supply 1220, a cap 1230, one or more bases 1240-1242, and a plurality of brackets 1251-1254.

In some embodiments, the metal poles 1213-1214 may be made of, for example, and without limitations, steel. Since the residential buildings typically include a wood frame, and the commercial buildings typically include metal frames, the portable wiring trainer 1200 of the present embodiments provides the technical advantage of being used as a trainer to teach students to practice wiring for both wood-structured and metal-structured buildings.

The portable wiring trainer 1200, in some embodiments, may be disassembled for ease of transportation, shipping, and storage. The poles 1211-1214 and the brackets 1251-1254, in some embodiments, are configured such that, during operation, the poles 1211-1214 may fit inside the brackets 1251-1254, respectively. In some embodiments, two of the poles 1211-1214 (e.g., two metal poles, two wood poles, or one wood pole and one metal pole) may be fixedly attached (e.g., and without limitations, by nails, screws, etc.) to their corresponding brackets while the other two poles may be freely inserted and removed from their corresponding brackets. In other embodiments, three or all four poles 1211-1214 may be freely inserted and removed from their corresponding brackets 1251-1254.

The cap 1230 of the portable wiring trainer 1200 may be configured to be easily removed from the rest of the trainer 1200. For example, the cap 1230, in some embodiments, may include a rim 1235 and a cavity 1238 inside the rim 1235. The cavity 1238 may be configured such that the cap 1235 may snugly fit over the poles 1211-1214 with no connectors, fasteners, glue, etc., after the poles 1211-1214 are inserted into their corresponding brackets 1251-1254.

The base 1240, in some embodiments, may be shaped to snugly fit between two pairs of the poles (e.g., the pair 1211 and 1213, and the pair 1212 and 1214 with no connectors, fasteners, glue, etc., after the poles are inserted into their corresponding brackets 1251-1254. The brackets 1251 and 1253, in some embodiments, may be attached to the base 1242 (e.g., by nails, bolts, screws, etc.). The brackets 1252 and 1254, in some embodiments, may be attached to the base 1241 (e.g., by nails, bolts, screws, etc.).

The base 1240, in some embodiments, may remain in place between the poles 1211-1214 with one or more latches (not shown) that may be easily opened and closed. One end 1271 of the base 1240, in some embodiments, may be attached with a hinge (not shown) between one pair of poles (e.g., the pair 1211 and 1213), with the other end 1272 of the base 1240 to snugly fit between two pairs of the poles 1211-1214 and remain in place (either with a latch or with no connectors).

The power supply 1220, in some embodiments, may be attached to one of the poles (in the example of FIG. 12 power supply 1220 is connected to the pole 1211). The power supply 1220 may be connected to a wall outlet (e.g., to a 110 V AC power source) through the electrical wires 1280. The power supply 1220 may include a transformer (not shown) that may convert the 110 V AC power to a low voltage AC power (e.g., and without limitations, 12 V AC, 24 V AC, a voltage less than or equal to 24 V AC, etc.). The power supply 1220 may provide the low voltage AC power through the electrical wires 1290 and 1295. The tips of the electrical wires 1290 and 1295 may be bare or may be attached to a conductive connector (not shown).

The students may use standard tools, such as, drills, hammers, screwdrivers, staplers, etc., to install conduit piping on the poles 1211-1214 and run wires through the conduit piping. The students may use the low voltage AC power at the electrical wires 1290 and 1295 to troubleshoot the way they have installed electrical wiring components. The power supply 1220 may include a circuit breaker (e.g., and without limitations, a 2 ampere circuit breaker with a pushbutton) 1270 that may be tripped if the current between the two electrical wires 1290 and 1295 exceeds a threshold. The pushbutton 1270 may be pressed to reconnect voltage between the two electrical wires 1290 and 1295.

The power supply 1220 provides the technical advantage of allowing the students to test their circuits using a safe low voltage AC power that is provided at the tips of the electrical wires 1290 and 1295 instead of using an AC voltage from the wall outlet. The use of the low voltage AC power and the circuit breaker 1270 guarantees a low amperage and reduces the danger that the students may receive an electric shock and get injured while testing their circuits.

Figure 13:
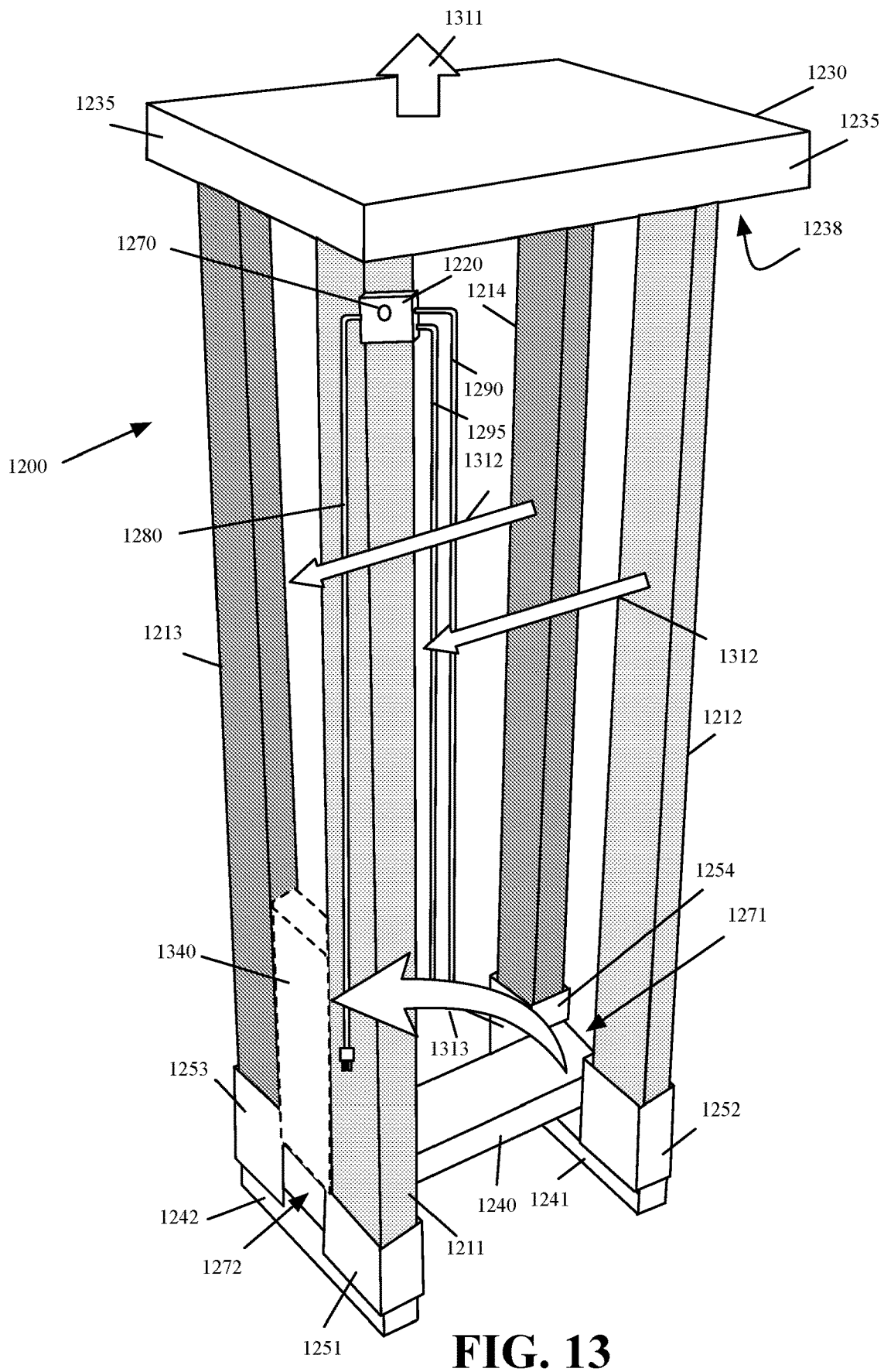
FIG. 13 is a perspective view illustrating the example movements that may be performed to collapse the wiring trainer of FIG. 12, according to various aspects of the present disclosure.

The portable wiring trainer 1200, in some embodiments, may be collapsed, for example, to a suitcase size for ease of shipping, transportation, and storage. FIG. 13 is a perspective view illustrating the example movements that may be performed to collapse the wiring trainer of FIG. 12, according to various aspects of the present disclosure. In order to collapse the portable wiring trainer 1200, the cap 1230 may be removed (e.g., by lifting of the cap in the direction of the arrow 1311 to release the poles 1211-1214 from inside the cap's cavity 1238). The end 1271 of the base 1240 may be removed from between the pair of poles 1212 and 1214 where the end 1271 is rested. For example, if the end 1271 is hinged, the hinge may be opened and the end 1271 may be moved out from between the poles 1212 and 1214. The base 1240 may then be fitted between the other two poles 1211 and 1213 (e.g., as shown by the dashed line 1340).

The ends 1271 and/or 1272, in some embodiments may be latched between the poles, in which case the latch(es) may be opened before fitting the base between the poles. The end 1272, in some embodiments may be connected by a hinge between the poles 1211 and 1213, in which case the base 1240 may be rotated around the hinge (e.g., in the direction of the arrow 1311). The two opposite poles may then be brought together (e.g., by moving the poles 1212 and 1214 in the direction of the arrows 1312) to collapse the portable wiring trainer 1200.

After the wiring trainer 1200 is collapsed, any other equipment, such as, wires, cables, electrical boxes, receptacles, pipes, bender tools, and/or other electrical installation items may be placed in the empty spaces between the poles 121-1214 and the wiring trainer 1200 may be shipped to students, transported around, and/or stored.

VII. Electronic System

The electronic devices such as the monitoring system 190, the electronic device(s) 122 (e.g., desktop computers, laptop computers, personal computers, tablet computers, server computers, mainframes, blade computers etc.), phones (e.g., smartphones), personal digital assistant (PDA), or any other sort of electronic devices may include memory. The memory in the above examples may be one or more units of similar or different memories. For example, the electronic devices' memory may include, without any limitations, random access memory (RAM), read-only-memory (ROM), read-only compact discs (CD-ROM), erasable programmable read-only memories (EPROMs), electrically erasable programmable read-only memories (EEPROMs), flash memory (e.g., secured digital (SD) cards, mini-SD cards, micro-SD cards, etc.), magnetic and/or solid state hard drives, ultra-density optical discs, and any other optical or magnetic media.

Electronic devices described above may include one or more processing units (or processors). The processing unit in above examples may be a single processor or a multi-core processor in different embodiments. The electronic devices in some of the present embodiments may store computer program instructions in the memory, which may be a machine-readable or computer-readable medium (alternatively referred to as computer-readable storage medium, machine-readable medium, or machine-readable storage medium). The computer-readable medium may store a program that is executable by at least one processing unit and includes sets of instructions for performing various operations. Examples of programs or computer code include machine code, such as is produced by a compiler, and files including higher-level code that are executed by a computer, an electronic component, or a microprocessor using an interpreter. From these various memory units, the processing unit may retrieve instructions to execute and data to process in order to execute the processes of the present embodiments. The electronic devices may include one or more buses that may include system, peripheral, and/or chipset buses that communicatively connect the numerous internal devices of an electronic device.

As used in this disclosure and any claims of this disclosure, the terms such as "processing unit," "processor," "controller," "microcontroller," "server", and "memory" all refer to electronic or other technological devices. These terms exclude people or groups of people. For the purposes of this disclosure, the terms display or displaying means displaying on an electronic device. As used in this disclosure and any claims of this disclosure, the terms "computer readable medium," "computer readable media," and "machine readable medium" are entirely restricted to tangible, physical objects that store information in a form that is readable by a processing unit. These terms exclude any wireless signals, wired download signals, and any other ephemeral or transitory signals.

In a first aspect, a system comprises: a plurality of trainers comprising first and second trainers, where the first trainer is an electronics trainer, comprising: a set of one of more output terminals configured to provide electrical output signals to control one or more electronic devices on other trainers of the plurality of trainers; a signal distribution relay, comprising: an output port connected to a first output terminal in the set of output terminals of the first trainer; a first input port configured to receive a first electrical signal; and a second input port configured to receive a second electrical signal; wherein the signal distribution relay connects or disconnects the first input port of the signal distribution relay to or from the output port of the signal distribution relay based on a voltage level of the second electrical; and a breadboard comprising a plurality of connectors configured to receive electronic components pins and connector wires of a user-designed circuit; wherein the second trainer comprises a set of one of more input terminals; wherein the second input port of the signal distribution relay of the first trainer is configured to receive a signal from the user-designed circuit of the first trainer; wherein a first output terminal in the set of output terminals of the first trainer is connected to a first input terminal in the set of input terminals of the second trainer; and wherein the user-designed circuit on the first trainer controls an electronic device on the second trainer by providing electrical signals to the electronic device on the second trainer through the first output terminal of the first trainer and the first input terminal of the second trainer.

In an embodiment of the first aspect, the first electrical signal is a direct current (DC) electrical signal, wherein the electrical control signal is a DC electrical signal, and wherein the signal distribution relay is a DC signal distribution relay.

In another embodiment of the first aspect, the second trainer is a programmable logic controller (PLC) trainer, wherein the user-designed circuit is a first user-designed circuit, wherein the electronic device on the second trainer is a PLC comprising a set of one or more input ports, wherein the PLC is configured to: receive an input from the first user-designed circuit on the first trainer through the first output terminal of the first trainer and the first input terminal of the second trainer; and provide a DC output signal to a second user-designed circuit on the second trainer.

In another embodiment of the first aspect, the second trainer is a motors trainer and the electronic device on the second trainer is a three-phase motor, wherein the second trainer comprises a variable frequency drive (VFD) connected to the three-phase motor, wherein the VFD is connected to the first input terminal of the second trainer; and wherein the user-designed circuit on the first trainer controls the three-phase motor by providing electrical signals through the first output terminal of the first trainer and the first input terminal of the second trainer.

In another embodiment of the first aspect, the first electrical signal is an alternative current (AC) electrical signal, wherein the electrical control signal is a direct current (DC) electrical signal, and wherein the signal distribution relay is an AC signal distribution relay.

In another embodiment of the first aspect, the second trainer is a motors trainer, wherein the electronic device on the second trainer is a one-phase motor that receives power through the first input terminal of the second trainer, and wherein the user-designed circuit on the first trainer controls the one-phase motor on the second trainer by turning the power to the one-phase motor on or off through the first output terminal of the first trainer and the first input terminal of the second trainer.

In another embodiment of the first aspect, the second trainer is a pneumatics trainer and the electronic device on the second trainer is a pneumatic device, the second trainer further comprising a programmable logic controller (PLC) that turns a flow of a fluid to the pneumatic device on or off; wherein an input port of the PLC is connected to the first input terminal of the second trainer; and wherein the user-designed circuit on the first trainer controls the pneumatic device on the second trainer by providing electrical signals to the input port of the PLC through the first output terminal of the first trainer and the first input terminal of the second trainer.

In another embodiment of the first aspect, the electronics trainer further comprises: a rechargeable battery configured to generate a direct current (DC) voltage at a DC output port of the battery; a battery charger configured to receive an alternative current (AC) voltage from an AC outlet and charge the rechargeable battery; an inverter configured to receive a DC input and generate an AC output; a power distribution relay comprising: an AC output port; a first input port configured to receive an AC voltage; a second input port connected to the AC output port of the inverter; and a third input port configured to: receive a DC voltage; and connect one of the first and second inputs ports to the AC output port based on a level of the received voltage; a switch configured to operate in at least two positions: wherein at a first position, the switch is configured to connect the AC outlet to the first input port of the power distribution relay; wherein at a second position, the switch is configured to disconnect the first input port of the power distribution relay from the AC outlet, to connect the DC output port of the battery to the inverter, and to connect the DC output port of the battery to the third input port of the power distribution relay; and one or more internal DC power supplies configured to: receive AC voltage from the AC output port of the power distribution relay; convert the AC voltage to a DC voltage; and provide DC voltage to one or more electronic circuits on the electronics trainer.

In another embodiment of the first aspect, at a third position, the switch is configured to disconnect the AC outlet from the power distribution relay, to disconnect the DC output port of the battery from the inverter, and to disconnect the DC output port of the battery from the third input port of the power distribution.

In another embodiment of the first aspect, the electronics trainer comprises a set of one of more AC output terminals connected to the AC output port of the power distribution relay to provide AC power to one or more trainers external to the electronics trainer.

In another embodiment of the first aspect, the electronics trainer further comprises: an oscilloscope configured to: receive power from an internal DC power supply in the plurality of internal DC power supplies of the electronics trainer; receive electrical signals from the user-designed circuit of the electronics trainer; and display waveforms corresponding to the received electrical signals on a display of the oscilloscope.

In another embodiment of the first aspect, the electronics trainer further comprises: a multimeter configured to receive power from an internal DC power supply in the plurality of internal DC power supplies of the electronics trainer; and measure one or more parameters of the user-designed circuit, the parameters comprising at least one of an electrical voltage, an electrical current, a resistance, a capacitance, a conductance, a sound level, a duty cycle, a frequency, an inductance, and a temperature.

In another embodiment of the first aspect, the electronics trainer further comprises: a rechargeable battery configured to: generate a direct current (DC) voltage output; and provide DC power to one or more electronic circuits on the electronics trainer; and an inverter configured to: receive a DC voltage from the DC voltage output of the rechargeable battery; convert the received DC voltage to an AC voltage output; and provide the AC voltage output to one or more electronic circuits on the electronics trainer.

In another embodiment of the first aspect, the electronics trainer further comprises a power connector configured to connect the rechargeable battery to an external battery charger.

In another embodiment of the first aspect, the second trainer further comprises: a rechargeable battery configured to generate a direct current (DC) voltage at a DC output port of the battery; a battery charger configured to receive an alternative current (AC) voltage from an AC outlet and charge the rechargeable battery; an inverter configured to receive a DC input and generate an AC output; a power distribution relay comprising: an AC output port; a first input port configured to receive an AC voltage; a second input port connected to the AC output port of the inverter; and a third input port configured to: receive a DC voltage; and connect one of the first and second inputs ports to the AC output port based on a level of the received voltage; a switch configured to operate in at least two positions: wherein at a first position, the switch is configured to connect the AC outlet to the first input port of the power distribution relay; wherein at a second position, the switch is configured to disconnect the first input port of the power distribution relay from the AC outlet, to connect the DC output port of the battery to the inverter, and to connect the DC output port of the battery to the third input port of the power distribution relay; and one or more internal DC power supplies configured to: receive AC voltage from the AC output port of the power distribution relay; convert the AC voltage to a DC voltage; and provide DC voltage to one or more electronic circuits on the second trainer.

In another embodiment of the first aspect, at a third position, the switch is configured to disconnect the AC outlet from the power distribution relay, to disconnect the DC output port of the battery from the inverter, and to disconnect the DC output port of the battery from the third input port of the power distribution.

In another embodiment of the first aspect, the second trainer comprises a set of one of more AC output terminals connected to the AC output port of the power distribution relay to provide AC power to one or more trainers external to the second trainer.

In another embodiment of the first aspect, the second trainer is one of a programmable logic controller (PLC) trainer, the motors trainer, and a pneumatics trainer.

In another embodiment of the first aspect, the second trainer further comprises: a rechargeable battery configured to: generate a direct current (DC) voltage output; and provide DC power to one or more electronic circuits on the second trainer; and an inverter configured to: receive a DC voltage from the DC voltage output of the rechargeable battery; convert the received DC voltage to an AC voltage output; and provide the AC voltage output to one or more electronic circuits on the second trainer.

In another embodiment of the first aspect, the second trainer further comprises a power connector configured to connect the rechargeable battery to an external battery charger.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A system, comprising:
  a plurality of trainers comprising first and second trainers, wherein the first trainer is a programmable logic controller (PLC) trainer comprising:
    a set of one of more output terminals configured to provide electrical output signals to control one or more electronic devices on other trainers of the plurality of trainers;
    a PLC configured to generate direct current (DC) output signals based on a user design;
    a rechargeable battery configured to:
      generate a DC voltage output; and
      provide the DC voltage output to one or more electronic circuits on the PLC trainer; and
    an inverter configured to:
      receive a DC voltage from the DC voltage output of the rechargeable battery;
      convert the received DC voltage to an alternative current (AC) voltage output; and
      provide the AC voltage output to one or more electronic circuits on the PLC trainer;

wherein the DC output signals of the PLC are connected to a first output terminal in the set of output terminals of the first trainer;
wherein the second trainer comprises a set of one of more input terminals;
wherein the first output terminal in the set of output terminals of the first trainer is connected to a first input terminal in the set of input terminals of the second trainer; and
wherein the PLC on the first trainer controls an electronic device on the second trainer by providing DC signals to the electronic device on the second trainer through the first output terminal of the first trainer and the first input terminal of the second trainer.

2. The system of claim 1, wherein the PLC comprises:
a programmable memory configured to store program instructions for performing the user design; and
a processor to execute stored program.

3. A system, comprising:
a plurality of trainers comprising first and second trainers,
wherein the first trainer is a programmable logic controller (PLC) trainer comprising:
　a set of one of more output terminals configured to provide electrical output signals to control one or more electronic devices on other trainers of the plurality of trainers; and
　a PLC configured to generate direct current (DC) output signals based on a user design;
wherein the DC output signals of the PLC are connected to a first output terminal in the set of output terminals of the first trainer;
wherein the second trainer is a motors trainer comprising:
　a three-phase motor;
　a set of one of more input terminals, wherein the first output terminal in the set of output terminals of the first trainer is connected to a first input terminal in the set of input terminals of the second trainer and
　a variable frequency drive (VFD) connected to the three-phase motor;
　　wherein the VFD is connected to the first input terminal of the second trainer; and
　　wherein the PLC on the first trainer controls the three-phase motor by providing DC signals through the first output terminal of the first trainer and the first input terminal of the second trainer; and
wherein the PLC on the first trainer controls the three-phase motor by providing DC signals to the three-phase motor through the first output terminal of the first trainer and the first input terminal of the second trainer.

4. The system of claim 1, wherein the second trainer is a pneumatics trainer, wherein the electronic device on the second trainer is a pneumatic device, wherein the PLC of the first trainer is a first PLC, wherein the second trainer further comprises a second PLC that turns a flow of a fluid to the pneumatic device on or off;
wherein an input port of the second PLC is connected to the first input terminal of the second trainer; and
wherein the first PLC on the first trainer controls the pneumatic device on the second trainer by providing DC signals to the input port of the second PLC through the first output terminal of the first trainer and the first input terminal of the second trainer.

5. The system of claim 1, wherein the PLC trainer further comprises:
a battery charger configured to receive an AC voltage from an AC outlet and charge the rechargeable battery;
a power distribution relay comprising:
　an AC output port;
　a first input port configured to receive an AC voltage;
　a second input port connected to the AC voltage output of the inverter; and
　a third input port configured to:
　　receive a DC voltage; and
　　connect one of the first and second inputs ports of the power distribution relay to the AC output port of the power distribution relay based on a level of the received voltage;
a switch configured to operate in at least two positions:
　wherein at a first position, the switch is configured to connect the AC outlet to the first input port of the power distribution relay;
　wherein at a second position, the switch is configured to disconnect the first input port of the power distribution relay from the AC outlet, to connect the DC voltage output of the battery to the inverter, and to connect the DC voltage output of the battery to the third input port of the power distribution relay; and
a set of one or more internal DC power supplies configured to:
　receive AC voltage from the AC output port of the power distribution relay;
　convert the AC voltage to a DC voltage; and
　provide the DC voltage to one or more electronic circuits on the PLC trainer.

6. The system of claim 5, wherein at a third position, the switch is configured to disconnect the AC outlet from the power distribution relay, to disconnect the DC voltage output of the battery from the inverter, and to disconnect the DC voltage output of the battery from the third input port of the power distribution.

7. The system of claim 5, wherein the PLC trainer comprises a set of one of more AC output terminals connected to the AC output port of the power distribution relay to provide AC power to one or more trainers external to the PLC.

8. The system of claim 1, wherein the PLC trainer further comprises a power connector configured to connect the rechargeable battery to an external battery charger.

9. The system of claim 1, wherein the PLC trainer further comprises a set of one of more input terminals, wherein the first input terminal of the set of input terminals of the PLC trainer is connected to an output terminal of a trainer in the plurality of trainers other than the first trainer, and wherein the PLC is configured to generate the direct DC output signals based on the user design and one or more DC signals received, at a first input terminal of the set of input terminals of the PLC trainer, from the output terminal of the trainer in the plurality of trainers other than the first trainer.

10. The system of claim 1, wherein the PLC trainer further comprises a set of one or more input sensors, wherein the PLC is configured to receive one or more DC signals from a first input sensor in the set of input sensors, and wherein the PLC is configured to generate the direct DC output signals based on the user design and one or more DC signals received from the first input sensor.

11. The system of claim 10, wherein the set of input sensors comprises at least one of an optical sensor, a photo-electric sensor, a proximity sensor, and a laser sensor.

12. The system of claim 1, wherein the PLC trainer further comprises a set of one or more manual input switches, wherein the PLC is configured to receive one or more DC signals from a first manual input switch in the set of manual input switches, and wherein the PLC is configured to generate the direct DC output signals based on the user design and one or more DC signals received from the first manual input switch.

13. The system of claim 1, wherein the PLC trainer further comprises a set of one or more DC output devices, wherein the DC output signals of the PLC are further connected to a first DC output device in the set of DC output devices, wherein the PLC is configured to control the first DC output device based on the user design and the DC output signals of the PLC.

14. The system of claim 1, wherein the PLC trainer further comprises:
- a set of one or more AC output devices, each AC output device comprising an AC input; and
- a set of one or more power distribution relays, each comprising power distribution relay comprising:
  - an AC output port;
  - a first input port configured to receive an AC voltage;
  - a second input port configured to:
    - receive a DC voltage; and
    - connect or disconnect the first input port of the power distribution relay to the AC output port of the power distribution relay based on a level of the received DC voltage,
- wherein the DC output signals of the PLC are further connected to the second input of a first power distribution relay in the set of power distribution relays, wherein the AC output of the first power distribution relay is connected to an AC input of a first AC output device in the set of AC output devices, and wherein the PLC is configured to connect or disconnect the AC voltage to the first AC output device based on the user design and the DC output signals of the PLC.

15. The system of claim 1, wherein the second trainer further comprises:
- a rechargeable battery configured to generate a DC voltage at a DC output port of the battery;
- a battery charger configured to receive AC voltage from an AC outlet and charge the rechargeable battery;
- an inverter comprising a DC input port and an AC output port, the inverter of the second trainer configured to receive a DC input at the DC input port of the inverter of the second trainer and generate an AC output at the AC output port of the inverter of the second trainer;
- a power distribution relay comprising:
  - an AC output port;
  - a first input port configured to receive an AC voltage;
  - a second input port connected to the AC output port of the inverter of the second trainer; and
  - a third input port configured to:
    - receive a DC voltage; and
    - connect one of the first and second inputs ports of the power distribution relay to the AC output port of the power distribution relay based on a level of the received voltage;
- a switch configured to operate in at least two positions:
  - wherein at a first position, the switch is configured to connect the AC outlet to the first input port of the power distribution relay;
  - wherein at a second position, the switch is configured to disconnect the first input port of the power distribution relay from the AC outlet, to connect the DC output port of the battery to the inverter of the second trainer, and to connect the DC output port of the battery to the third input port of the power distribution relay; and
- a set of one or more internal DC power supplies configured to:
  - receive AC voltage from the AC output port of the power distribution relay;
  - convert the received AC voltage to a DC voltage; and
  - provide the DC voltage to one or more electronic circuits on the second trainer.

16. The system of claim 15, wherein at a third position, the switch is configured to disconnect the AC outlet from the power distribution relay, to disconnect the DC output port of the battery from the inverter of the second trainer, and to disconnect the DC output port of the battery from the third input port of the power distribution.

17. The system of claim 15, wherein the second trainer comprises a set of one of more AC output terminals connected to the AC output port of the power distribution relay to provide AC power to one or more trainers external to the second trainer.

18. The system of claim 17, wherein the second trainer is one of a PLC trainer, a motors trainer, and a pneumatics trainer.

19. A system, comprising:
- a plurality of trainers comprising first and second trainers,
- wherein the first trainer is a programmable logic controller (PLC) trainer comprising:
  - a set of one of more output terminals configured to provide electrical output signals to control one or more electronic devices on other trainers of the plurality of trainers; and
  - a PLC configured to generate direct current (DC) output signals based on a user design;
- wherein the second trainer comprises:
  - a set of one of more input terminals;
  - a rechargeable battery configured to:
    - generate a DC voltage output; and
    - provide the DC voltage output to one or more electronic circuits on the second trainer; and
  - an inverter configured to:
    - receive a DC voltage from the DC voltage output of the rechargeable battery;
    - convert the received DC voltage to an alternative current (AC) voltage output; and
    - provide the AC voltage output to one or more electronic circuits on the second trainer; and
- wherein the DC output signals of the PLC are connected to a first output terminal in the set of output terminals of the first trainer.

20. The system of claim 19, wherein the second trainer further comprises a power connector configured to connect the rechargeable battery to an external battery charger.

* * * * *